(12) United States Patent
Yasuda et al.

(10) Patent No.: US 11,226,437 B2
(45) Date of Patent: Jan. 18, 2022

(54) HIGH REFRACTIVE INDEX FILM AND OPTICAL INTERFERENCE FILM

(71) Applicant: FUJIFILM CORPORATION, Tokyo (JP)

(72) Inventors: Hideki Yasuda, Kanagawa (JP); Ryou Matsuno, Kanagawa (JP); Motoi Harada, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 149 days.

(21) Appl. No.: 16/584,849

(22) Filed: Sep. 26, 2019

(65) Prior Publication Data

US 2020/0041703 A1 Feb. 6, 2020

Related U.S. Application Data

(63) Continuation of application No. PCT/JP2018/008177, filed on Mar. 2, 2018.

(30) Foreign Application Priority Data

Mar. 28, 2017 (JP) ............................. JP2017-063490

(51) Int. Cl.
*G02B 5/08* (2006.01)
*G02B 1/11* (2015.01)
*G02B 5/28* (2006.01)

(52) U.S. Cl.
CPC .................. *G02B 5/08* (2013.01); *G02B 1/11* (2013.01); *G02B 5/28* (2013.01)

(58) Field of Classification Search
CPC . G02B 5/008; G02B 5/08; G02B 1/11; G02B 5/28; G02B 1/115; G02B 5/206; G02B 5/286
See application file for complete search history.

(56) References Cited

U.S. PATENT DOCUMENTS

| 4,374,158 A | 2/1983 | Taniguchi et al. |
| 2004/0151895 A1 | 8/2004 | Itoh et al. |

(Continued)

FOREIGN PATENT DOCUMENTS

| CN | 1666119 A | 9/2005 |
| CN | 100537217 C | 9/2009 |

(Continued)

OTHER PUBLICATIONS

Choi M. et al., "A terahertz metamaterial with unnaturally high refactive index," Nature, vol. 470, Macmillan Publishers Limited, Feb. 17, 2011, pp. 369-373.

(Continued)

*Primary Examiner* — Kimberly N. Kakalec
(74) *Attorney, Agent, or Firm* — Solaris Intellectual Property Group, PLLC

(57) ABSTRACT

Provided are a high refractive index film including a high refractive index layer including a binder and flat metal particles, in which a value obtained by dividing an average particle diameter of the flat metal particles by an average thickness is 3 or more, a main plane of the flat metal particles is plane-oriented in a range of 0° to 30° with respect to a surface of the high refractive index layer, a volume fraction of the flat metal particles of the high refractive index layer is 20 volume % or more, and the flat metal particles are stacked in two or more layers, and an optical interference film using the high refractive index film.

13 Claims, 17 Drawing Sheets

(56) References Cited

U.S. PATENT DOCUMENTS

| | | |
|---|---|---|
| 2006/0023127 A1 | 2/2006 | Peeters et al. |
| 2011/0111210 A1* | 5/2011 | Matsunami ........... C03C 17/008 428/328 |
| 2011/0240905 A1 | 10/2011 | Funakubo et al. |
| 2013/0071651 A1 | 3/2013 | Hakuta et al. |
| 2013/0100523 A1 | 4/2013 | Taima et al. |
| 2013/0122281 A1 | 5/2013 | Hakuta et al. |
| 2013/0260139 A1 | 10/2013 | Kamada et al. |
| 2015/0002928 A1 | 1/2015 | Kiyoto et al. |
| 2015/0017424 A1* | 1/2015 | Matsuno ............... C03C 17/008 428/323 |
| 2015/0168618 A1 | 6/2015 | Nakajima |
| 2016/0062000 A1 | 3/2016 | Kimura et al. |
| 2016/0290036 A1 | 10/2016 | Nukui et al. |

FOREIGN PATENT DOCUMENTS

| | | |
|---|---|---|
| CN | 102249548 A | 11/2011 |
| CN | 102933990 A | 2/2013 |
| CN | 103003729 A | 3/2013 |
| CN | 104169750 A | 11/2014 |
| CN | 104246549 A | 12/2014 |
| CN | 105122096 A | 12/2015 |
| CN | 105848890 A | 8/2016 |
| JP | 2007-298661 A | 11/2007 |
| JP | 2013-037013 A | 2/2013 |
| JP | 2015-051608 A | 3/2015 |
| KR | 20150145895 A | 12/2015 |
| WO | 02/084338 A2 | 10/2002 |
| WO | 2011/152147 A1 | 12/2011 |
| WO | 2013/179902 A1 | 12/2013 |

OTHER PUBLICATIONS

International Search Report issued in International Application No. PCT/JP2018/008177, dated May 15, 2018.
Written Opinion of the ISA issued in International Application No. PCT/JP2018/008177, dated May 15, 2018.
English language translation of the following: Office action dated Jan. 28, 2020, from the JPO in Japanese patent application No. 2019-509072, which corresponds to the instant patent application.
English language translation of the following: Office action dated Jan. 13, 2021 from the SIPO in a Chinese patent application No. 201880022092.X corresponding to the instant patent application. This office action translation is submitted now in order to supplement the understanding of the cited references which are being disclosed in the instant Information Disclosure Statement.
English language translation of the following: Office action dated Jul. 8, 2021, from the SIPO in a Chinese patent application No. 201880022092.X corresponding to the instant patent application. This office action translation is submitted now in order to supplement the understanding of the cited reference which is being disclosed in the instant Information Disclosure Statement.

* cited by examiner

HIGH REFRACTIVE INDEX FILM AND OPTICAL INTERFERENCE FILM

CROSS-REFERENCE TO RELATED APPLICATIONS

This application is a continuation of International Application No. PCT/JP2018/008177, filed Mar. 2, 2018, which claims priority from Japanese Patent Application No. 2017-063490, filed Mar. 28, 2017. The above applications are hereby expressly incorporated by reference, in their entireties, into the present application.

BACKGROUND OF THE INVENTION

1. Field of the Invention

The present disclosure relates to a high refractive index film and an optical interference film.

2. Description of the Related Art

In recent years, in a device such as an infrared camera, an infrared heater, and a thermal insulation film, importance of performing wavelength control of infrared rays is increasing.

For example, in an infrared camera, an optical interference film which selectively transmits infrared light with a wavelength of 8 μm to 14 μm, which is less affected by absorption by moisture in the air, is used.

The optical interference film is designed by laminating a high refractive index material and a low refractive material. As the refractive index difference between the high refractive index material and the low refractive material is greater, the performances as an optical interference film are improved, and thus manufacturing of a high refractive index material having a higher refractive index has been studied.

For example, JP2007-298661A discloses an antireflection film for infrared light in which a plurality of thin films are formed on a silicon substrate in a laminated state, a germanium layer, a zinc sulfide layer, a germanium layer, a zinc sulfide layer, and a yttrium fluoride layer are sequentially laminated from the silicon substrate side on at least one surface of the silicon substrate, such that the optical film thickness of each of these layers is set such that transmission characteristics are 90% or more in the infrared wavelength range around 6 to 12 μm.

Further, Choi M, Lee S H, Kim Y, Kang S B, Shin J, Kwak M H, Kang K Y, Lee Y H, Park N, and Min B, A terahertz metamaterial with unnaturally high refractive index, Nature, 470, 369 and 373 discloses a high refractive index film using a metamaterial.

SUMMARY OF THE INVENTION

With respect to the antireflective film using germanium disclosed in JP2007-298661A, the present inventors have found that an antireflection film is required to be formed by vapor phase deposition such as vapor deposition or sputtering, and thus has the problem of low productivity.

The present inventors have also found that the metamaterial structure disclosed in Choi M, Lee S H, Kim Y, Kang S B, Shin J, Kwak M H, Kang K Y, Lee Y H, Park N, and Min B, A terahertz metamaterial with unnaturally high refractive index, Nature, 470, 369 and 373 is required to be manufactured by a method such as photolithography, and also has the problem of low productivity.

An object to be achieved by the embodiments of the present invention is to provide high refractive index film having a high refractive index and capable of forming a film by liquid phase film formation, and an optical interference film using the high refractive index film.

Means for solving the above problems include the following aspects.

<1> A high refractive index film, comprising:
a base material; and
a high refractive index layer including a binder and flat metal particles,
wherein a value obtained by dividing an average particle diameter of the flat metal particles by an average thickness of the flat metal particles is 3 or more,
the flat metal particles have a main plane that is plane-oriented in a range of 0° to 30° with respect to a surface of the base material,
the flat metal particles have a volume fraction of 20 volume % or more in the high refractive index layer, and
the flat metal particles are stacked in two or more layers.
<2> The high refractive index film according to <1>, in which the flat metal particles are randomly oriented in a surface direction of the base material.
<3> The high refractive index film according to <1> or <2>, in which the flat metal particles at least include silver.
<4> The high refractive index film according to any one of <1> to <3>, in which the flat metal particles have a main plane having a hexagonal or higher polygonal shape or a circular shape.
<5> The high refractive index film according to any one of <1> to <4>, in which the flat metal particles exhibit localized surface plasmon resonance, and have a plasmon resonance wavelength in a wavelength range of 0.5 μm to 5 μm.
<6> The high refractive index film according to any one of <1> to <5>, in which the binder includes a polymer.
<7> An optical interference film comprising: the high refractive index film according to any one of <1> to <6>.
<8> The optical interference film according to <7>, which is an antireflection film.
<9> The optical interference film according to <7>, which is a high reflection film.
<10> The optical interference film according to <7>, which is a band pass filter or a long pass filter.

According to the embodiment of the present invention, it is possible to provide a high refractive index film having a high refractive index and capable of forming a film by liquid phase film formation, and an optical interference film using the high refractive index film.

DESCRIPTION OF THE PREFERRED EMBODIMENTS

Figure 1:
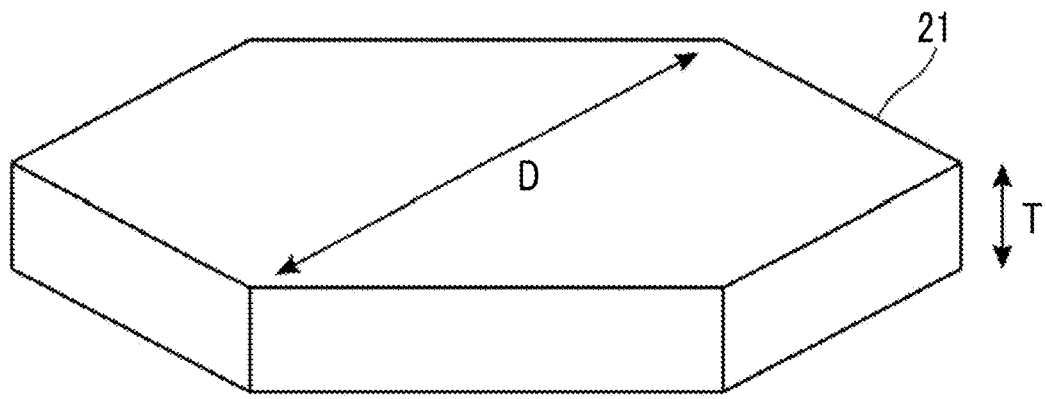
FIG. 1 is a schematic view illustrating an example of a flat metal particle.

Hereinafter, contents of the present disclosure are specifically described. Configuration requirements described below are described based on representative embodiments of the present disclosure, but the present disclosure is not limited to the embodiments.

According to the present disclosure, the expression "to" indicating a numerical range is used to mean that numerical values described before and after the expression are included as a lower limit value and an upper limit value.

In the present disclosure, the expression "step" includes not only an independent step but also a step in a case of not being clearly distinguished from the other steps, as long as an intended purpose is achieved.

In the present disclosure, unless otherwise described, a molecular weight in a polymer component is a weight-average molecular weight (Mw) or number-average molecular weight in terms of polystyrene measured by gel permeation chromatography (GPC) in a case where tetrahydrofuran (THF) is used as a solvent (Mn).

In the present disclosure, a "surface of the base material" refers to a surface on the base material side having the high refractive index layer, unless otherwise described.

According to the present disclosure, combination of preferable embodiments is a more preferable embodiment.

(High Refractive Index Film)

The high refractive index film according to the present disclosure has a base material and a high refractive index layer including a binder and flat metal particles, wherein a value obtained by dividing an average particle diameter of the flat metal particles by an average thickness of the flat metal particles is 3 or more, the flat metal particles have a main plane that is plane-oriented in a range of 0° to 30° with respect to a surface of the base material, the flat metal particles have a volume fraction of 20 volume % or more in the high refractive index layer, and the flat metal particles are stacked in two or more layers.

As described above, there has been a problem in that a high refractive index material using germanium or the like and a high refractive index material using a metamaterial which are known as conventional high refractive index materials have low productivity.

Therefore, the present inventors have diligently researched to find that the high refractive index film according to the present disclosure has a high refractive index, is capable of forming a film by liquid phase film formation, and has high productivity.

The reason why a high refractive index film can be obtained in the present structure is presumed as follows.

The present structure has a high refractive index layer including a binder and flat metal particles. In a case where the particle diameters and thicknesses of the flat metal particles are sufficiently smaller than infrared light, a refractive index in the high refractive index layer can be considered to be substituted by an effective homogeneous film in the effective medium approximation.

The refractive index of the homogeneous film is considered to depend on the polarization of the flat metal particles included in the high refractive index layer. That is, it is considered that a refractive index of the homogeneous film can be increased by increasing the polarization of the flat metal particles.

Here, since a large number of free electrons exist in the flat metal particles used in the present structure, a large bias is likely to occur in the distribution of free electrons due to an incident electric field, and the polarization becomes larger than that in the case of using nonmetallic particles.

In the present structure, the value obtained by dividing the average particle diameter of the flat metal particles by the average thickness of the flat metal particles is 3 or more, and the flat metal particles have a main plane that is plane-orientated in the range of 0° to 30° with respect to the surface of the base material. It is considered that the plane-orientation of the flat particles exhibits larger polarization with respect to incident rays.

In a case where the volume fraction of the flat metal particles in the high refractive index layer is 20 volume % or more, the refractive index can be further increased.

Since the flat metal particles are stacked in two or more layers, an optical path length in the film becomes large, incident rays and the high refractive index layer easily interact with each other, and thus it is easily possible to form a high refractive index film having a high refractive index.

Hereinafter, components contained in the high refractive index film according to the present disclosure and the characteristics of the high refractive index film are described.

<Layer Configuration>

The high refractive index film according to the present disclosure has a base material and a high refractive index layer containing a binder and flat metal particles.

The high refractive index film according to the present disclosure may have other layers such as a low refractive index layer. In a case where the high refractive index film according to the present disclosure has the other layers, for example, the high refractive index film is suitably used as an optical interference film which is an antireflection film, a high reflection film, a band pass filter, or a long pass filter. Preferable embodiments of the other layers in a case of being used in various kinds of applications are described below.

<Refractive Index>

The refractive index of the high refractive index layer according to the present disclosure in a wavelength of 10 μm preferably 3 or more and more preferably 5 or more.

The upper limit of the refractive index is not particularly limited, and for example, may be 50 or less.

With respect to the high refractive index layer used in the present disclosure, depending on the applications, it is preferable that the refractive index wavelength of 5 μm to 15 μm is in the above range, it is more preferable that the refractive index in the wavelength of 2 μm to 15 μm in the above range, and it is even more preferable that the refractive index in the wavelength of 2 μm to 25 μm in the above range.

The refractive index is measured based on a multiple reflection theory and Fresnel interference theory by measuring spectral reflectance and spectral transmittance by using a Fourier transform infrared spectrophotometer (FTIR). The refractive index and the extinction coefficient of the base material are calculated and used for the calculation.

<Flat Metal Particle>

The high refractive index layer used in the present disclosure contains flat metal particles.

[Shape]

The flat metal particle refers to a particle comprising two main planes opposite to each other, and the shape of the main plane is not particularly limited, and examples thereof include an octagonal shape, a hexagonal shape, a triangular shape, and a circular shape. Among these, in view of enhancing the transmittance of infrared light, it is preferable that the shape of the main plane is a hexagonal or higher polygonal shape or a circular shape.

In the present disclosure, a circular shape means a shape in which, in one flat metal particle, the number of sides having a length of 50% or more of the after-mentioned average equivalent circular diameter of the flat metal particle is 0. The circular flat metal particle is not particularly limited, as long as the circular flat metal particle has no corners and has a round shape in a case where the flat metal particle is observed from the upper side of the main plane thereof by using a transmission electron microscope (TEM).

In the present specification, a hexagonal shape means a shape in which, in one flat metal particle, the number of sides having a length of 20% or more of the after-mentioned average equivalent circular diameter of the flat metal particle is six. The same applies to other polygonal shapes. The hexagonal flat metal particle is not particularly limited as long as the hexagonal flat metal particle has a hexagonal shape in a case where the hexagonal flat metal particle is observed from above the main plane thereof with a transmission electron microscope (TEM), and may be appropriately selected according to the purpose. For example, the hexagonal corner may be acute or obtuse, but in view of reducing absorption in the visible light region, it is preferable that the hexagonal shape has at least one obtuse angle, and it is more preferable that all the six corners are obtuse. The angle of the obtuse angle is not particularly limited, and can be appropriately selected according to the purpose.

With respect to the angle of the obtuse angle, it is preferable that the corner may be dull. A dull corner means that the corner is not formed by two straight lines, but the corner apex has a rounded shape. The degree of dullness of the corner is not particularly limited, and can be appropriately selected according to the purpose.

—Average Particle Diameter (Average Equivalent Circular Diameter)—

An equivalent circular diameter is represented by the diameter of a circle having the same area as the projected area of an individual particle. The projected area of each particle can be obtained by a well-known method of measuring the area on an electron micrograph and correcting the area with respect to photographing magnification. The average particle diameter (average equivalent circle diameter) can be obtained by obtaining a particle size distribution of equivalent circular diameters D of 200 flat metal particles and calculating an arithmetic mean value of the equivalent circular diameters D.

The average particle diameter is not particularly limited, and is preferably 50 nm to 2,000 nm, more preferably 70 nm to 1,500 nm, and even more preferably 100 nm to 1,000 nm.

—Average Thickness and Aspect Ratio—

The average thickness of the flat metal particles is preferably 50 nm or less, more preferably 2 nm to 25 nm, and particularly preferably 4 nm to 15 nm.

Figure 2:
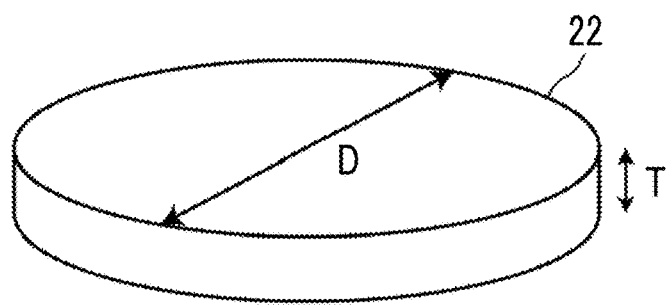
FIG. 2 is a schematic view illustrating another example of a flat metal particle.

A particle thickness T corresponds to a distance between main planes of a flat metal particle, and for example, is a thickness as illustrated in FIGS. 1 and 2. The particle thickness T can be measured by a transmission electron microscope (TEM).

Examples of the method of measuring the average particle thickness with a TEM include a method of measuring thicknesses of particles by subjecting a film including flat metal particles to a coating treatment by carbon deposition or metal vapor deposition, forming a cross-sectional cut piece by focused ion beam (FIB) processing, and observing the cross section with a TEM.

A value D/T (referred to as an "aspect ratio") obtained by dividing an average particle diameter D of the flat metal particles by an average thickness T of the flat metal particles is not particularly limited, as long as the value is 3 or more, and can be appropriately selected according to the purpose, but in view of trade-off between a high refractive index and a scattering loss of incident rays, the value is preferably 5 to 100 and more preferably 5 to 60.

In a case where the aspect ratio is 3 or more, it is possible to obtain a high refractive index, and in a case where the aspect ratio is within 100, the scattering loss of the incident rays can be suppressed.

The ratio of the maximum length to the minimum length in the main plane in a case where the particle is observed from above is not particularly limited, and can be appropriately selected according to the purpose, but in view of suppressing the anisotropy of the refractive index, the ratio is preferably 10 or less.

[Plane Orientation]

The flat metal particles in the high refractive index layer have a main plane that is plane-oriented in the range of 0° to 30° with respect to the surface of the base material.

Hereinafter, the description is made by using FIG. 3.

Figure 3:
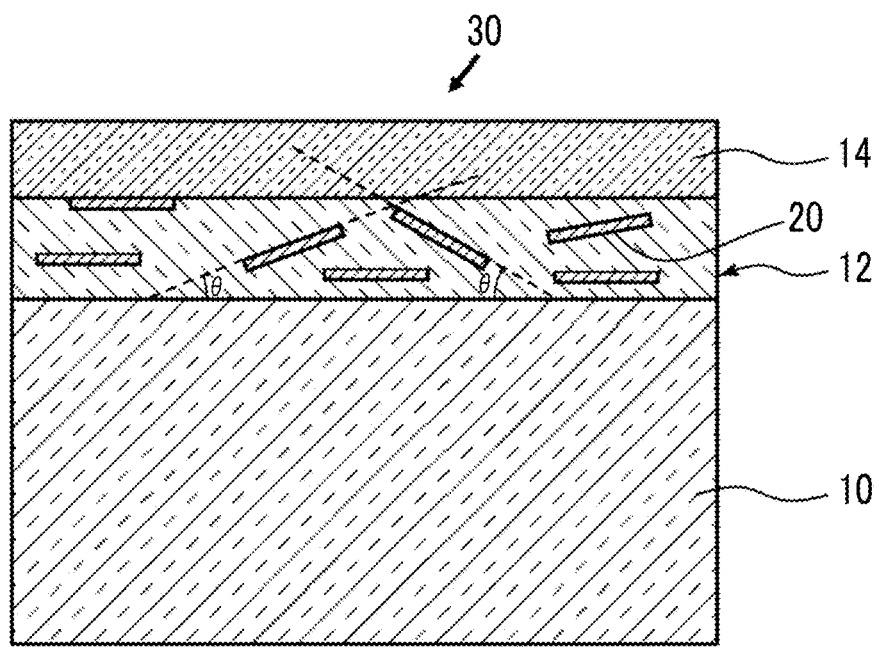
FIG. 3 is a schematic cross-sectional view illustrating an example of a high refractive index layer 12 including flat metal particles 20.

FIG. 3 is a schematic cross-sectional view illustrating an example of a high refractive index layer 12 including flat metal particles 20 in the high refractive index film according to the present disclosure. A high refractive index film 30 in FIG. 3 has a high refractive index layer 12, a low refractive index layer 14, and a base material 10. Hereinafter, an angle θ formed by the base material 10 and a main plane (a surface determining the equivalent circular diameter D) of the flat metal particle 20 is described by using FIG. 3.

In FIG. 3, an angle (an absolute value of the angle) formed by the surface of the base material 10 and a main plane (a surface determining the equivalent circular diameter D) of the flat metal particle 20 or an extension of the main plane of the flat metal particle 20 is 0° to 30°. Here, the angle θ refers to the smaller angle among the angles formed by the surface of the base material 10 and the main plane (the surface determining the equivalent circular diameter D) of the flat metal particle 20 or an extension of the main plane of the flat metal particle 20.

In the present disclosure, that the flat metal particles have a main plane that is plane-oriented in the range of 0° to 30° with respect to the surface of the base material means that the arithmetic mean value of the absolute values of the θ measured with respect to freely-selected 100 particles is 0° to 30°. The arithmetic mean value obtained is also referred to as a "degree of plane orientation".

The absolute values of the θ are measured by a method of manufacturing a cross sectional cut piece of the high refractive index film, observing the high refractive index layer and the flat metal particles in the cut piece, and performing evaluation.

Specifically, examples thereof include a method of manufacturing a cross-section sample of a high refractive index film by using a focused ion beam (FIB), observing the sample by using a transmission electron microscope (TEM) to obtain an image, and performing evaluation from the image.

The method of observing the cross sectional cut piece sample manufactured as described above is not particularly limited, as long as it is possible to check whether the main plane of the flat metal particles with respect to the surface of the base material in the sample is plane-oriented, and examples thereof include a method of using a TEM. In a case of the cross sectional cut piece sample, observation may be performed by a TEM.

The flat metal particles have a main plane that is plane-oriented in the range of 0° to 30° with respect to the surface of the base material, preferably plane-oriented in the range of 0° to 20° and more preferably plane-oriented in the range of 0° to 10°. In a case where the cross section of the high refractive index film is observed, the flat metal particle 20 is more preferably oriented in a state in which an angle (±θ) illustrated in FIG. 3 is small. In a case where θ is more than 30°, a size of the polarization occurring in the flat metal particle is small, and the high refractive index (for example, a refractive index in the wavelength of 5 μm to 15 μm is 3 or more) cannot be obtained in some cases.

[Material]

The material of the metal particles is not particularly limited and can be appropriately selected according to the purpose, and in view of low absorbance for infrared rays, silver, gold, aluminum, copper, rhodium, nickel, platinum, titanium, or an alloy thereof is preferable, and among these, silver is more preferable.

[Content Ratio of Flat Metal Particles]

In the present disclosure, one kind of flat metal particles may be used singly or two or more kinds thereof may be in combination.

The volume fraction of the flat metal particles in the high refractive index layer is not particularly limited, as long as the volume fraction is 20 volume % or more, but in view of enhancing the refractive index, the volume fraction is preferably 25 volume % or more and more preferably 30 volume % or more.

With respect to the volume fraction of the flat metal particles in the high refractive index layer, for example, a method of manufacturing an appropriate cross sectional cut piece, observing a presence ratio of the flat metal particles in this cut piece, and performing the evaluation can be applied. The method of observing the cross sectional cut piece is the same as the method of observing the cross sectional cut piece in a case of measuring the absolute value of the θ in the plane orientation described above.

[Stacking State of Flat Metal Particles]

In the flat metal particles, it is preferable that the flat metal particles are stacked in two or more layers in the high refractive index layer, and it is more preferable that the flat metal particles are stacked in three or more layers. The upper limit is not particularly limited, and it is preferable to be stacked in 50 or less layers.

Here, whether the flat metal particles are stacked in two or more layers can be checked by manufacturing a cross sectional cut piece and observing a stacking state of the flat metal particles in the cut piece. Specifically, in a case of manufacturing a cross sectional cut piece sample of the high refractive index film by using a focused ion beam (FIB) or the like and observing the sample by using various microscopes (for example, a TEM), in a case where 100 lines are drawn in a direction perpendicular to the film surface at intervals of the average particle diameter, in a case where 75 or more lines cross two or more flat metal particles, it is defined that the flat metal particles are stacked in two or more layers.

Similarly, in a case where 75 or more lines cross three or more flat metal particles, it is defined that the flat metal particles are stacked in three or more layers. Hereinafter, the same applies to four or more layers.

[Orientation State of Flat Metal Particles]

It is preferable that the flat metal particles are randomly orientated in the surface direction of the base material.

The expression "the flat metal particles are randomly orientated in the surface direction of the base material" means that the particle coordinates in the directions horizontal to the surface of the base material are random. Here, the expression "random" means that there is no significant maximum point other than the origin in the power spectrum of spatial frequency obtained by performing Fourier transformation on the particle coordinates in the horizontal directions with the base material. Here, it is assumed that the peak of spatial frequency 1/R (R indicates an average particle diameter) generated due to the displacement of particles is not regarded as the maximum point.

Specifically, in a case where a cross section sample or a cross section cut piece sample of a high refractive index film is manufactured by using a focused ion beam (FIB) or the like, and the samples are observed by using various microscopes (transmission electron microscope (TEM) and the like), the center coordinates of 100 flat metal particles in the surface directions of the base material and the direction horizontal to the above directions are determined, and the randomness can be evaluated from the power spectrum of the spatial frequency obtained by Fourier transformation of the coordinates.

[Plasmon Resonance]

The flat metal particles exhibit localized surface plasmon resonance and preferably have a plasmon resonance wavelength in a wavelength range of 0.5 μm to 5 μm, and more preferably have a plasmon resonance wavelength in a wavelength range of 0.8 μm to 5 μm.

In a case where the flat metal particles exhibit localized surface plasmon resonance, for example, visible light (light with a wavelength of 400 nm or more and less than 780 nm) is absorbed, and it is possible to reduce the transmittance of visible light.

The plasmon resonance wavelength of the flat metal particles can be adjusted by a material of the flat metal particles and a refractive index of the binder described below.

The plasmon resonance wavelength is measured by measuring the spectral reflectance by using a Fourier transform infrared spectrophotometer (FTIR) or a spectrophotometer and calculating the maximum point of the spectral reflectance. It is preferable to use a spectrophotometer in a case where the plasmon resonance wavelength is 0.8 μm to 2.5 μm, and it is preferable to use a Fourier transform infrared spectrometer in a case where the plasmon resonance wavelength is 2.5 μm to 5.0 μm.

[Method of Synthesizing Flat Metal Particles]

The method of synthesizing the flat metal particles is not particularly limited, and can be appropriately selected according to the purpose, and for example, a liquid phase method such as a chemical reduction method, a photochemical reduction method, and an electrochemical reduction method are provided, as a method of synthesizing flat metal particles (particularly, flat metal particles in a hexagonal or higher polygonal shape or a circular shape). Among these, in view of shape and size controllability, liquid phase methods such as a chemical reduction method and a photochemical reduction method are particularly preferable. After synthesis of the hexagonal to triangular flat metal particles, the hexagonal to circular flat metal particles may be obtained, for example, by performing an etching treatment with a dissolving species that dissolves silver such as nitric acid or sodium sulfite, or an aging process by heating so as to dull the corners of the hexagonal to triangular metal particles.

As a method of synthesizing flat metal particles, after a seed crystal is fixed on the surface of the base material to be described below in advance, metal particles (for example, Ag) may be crystal-grown in a flat shape.

In the high refractive index film according to the present disclosure, a treatment may be further performed on the flat metal particles in order to apply desired properties. Examples of the further treatment include formation of a high refractive index shell layer, and addition of various additives such as a dispersing agent and an antioxidant.

<Binder>

The high refractive index layer according to the present disclosure includes a binder.

The binder is not particularly limited as long as the binder is a material that can form a film in a liquid phase, but it is preferable that the binder is a material that can maintain the flat metal particles in a state of being dispersed.

The binder in the metal particle-containing layer preferably includes a polymer, a rubber, or an inorganic substance formed by a sol-gel method, and more preferably includes a polymer.

Examples of the preferable polymer include polymers such as a polyolefin resin, a cyclic polyolefin resin, a polyvinyl acetal resin, a polyvinyl alcohol resin, a polyvinyl butyral resin, a polyacrylate resin, a polymethyl methacrylate resin, a polycarbonate resin, a polyvinyl chloride resin, a (saturated) polyester resin, a polyurethane resin, and a natural polymer such as gelatin and cellulose.

Among these, in view of transparency to infrared light, it is preferable that the main polymer is preferably a polyolefin resin or a cyclic polyolefin resin.

As the polymer, commercially available ones can be preferably used, and examples thereof include ARROWBASE which is a modified polyolefin resin manufactured by Unitika Ltd., CHEMIPEARL which is a polyolefin aqueous dispersion manufactured by Mitsui Chemical Inc., HARDLEN which is a modified polyolefin resin manufactured by Toyobo Co., Ltd., and HITECH manufactured by Toho Chemical Industry Co., Ltd.

In the present disclosure, the main polymer refers to a polymer component that occupies 50 mass % or more of the polymer included in the high refractive index layer.

As the rubber, well-known rubber can be used, but it is preferable to use nitrile rubber, ethylene propylene rubber, and butyl rubber in view of transparency to infrared light.

As inorganic materials that are formed by the sol-gel method, well-known materials can be used. Examples of such materials include oxide such as silica and titanium oxide, and fluoride such as magnesium fluoride.

The binder in the present disclosure is preferably transparent to infrared light. In the present disclosure, "transparent to infrared light" means that the transmittance of infrared light having any wavelength in the range of 780 nm to 25 μm is 20% or more, and preferably 30% or more, and more preferably 50% or more. The upper limit of the transmittance is not particularly limited, and may be 100% or less. The transmittance is measured by using spectral reflectance with a Fourier transform infrared spectrometer (FTIR) or a spectrophotometer.

[Refractive Index]

The refractive index of the binder used in the present disclosure is preferably less than 2.0, more preferably 1.2 to 1.8, and even more preferably 1.3 to 1.7.

In a case where the refractive index of the binder is in the above range, the flat metal particles are not contained, or the content ratio is less than 20 volume %, and it is possible to use a layer including a binder as a low refractive index layer.

The refractive index of the binder is calculated based on the multiple reflection theory and the Fresnel interference theory by measuring the spectral reflectance and the spectral transmittance with a Fourier transform infrared spectrophotometer (FTIR).

[Content Ratio]

The high refractive index layer according to the present disclosure contains the binder preferably by 10 volume % to 80 volume %, more preferably by 15 volume % to 75 volume %, and even more preferably by 25 volume % to 70 volume %.

The content ratio of the binder is calculated by the same method as the content ratio of the flat metal particles described above.

<Other Components>

The high refractive index layer according to the present disclosure may contain other components in addition to the flat metal particles and the binder. Examples of the other component include air and well-known additives.

<Thickness of High Refractive Index Layer>

The thickness of the high refractive index layer is appropriately selected according to the applications, and for example, is preferably 0.01 μm to 2 μm and more preferably 0.02 μm to 0.5 μm.

Figure 4:
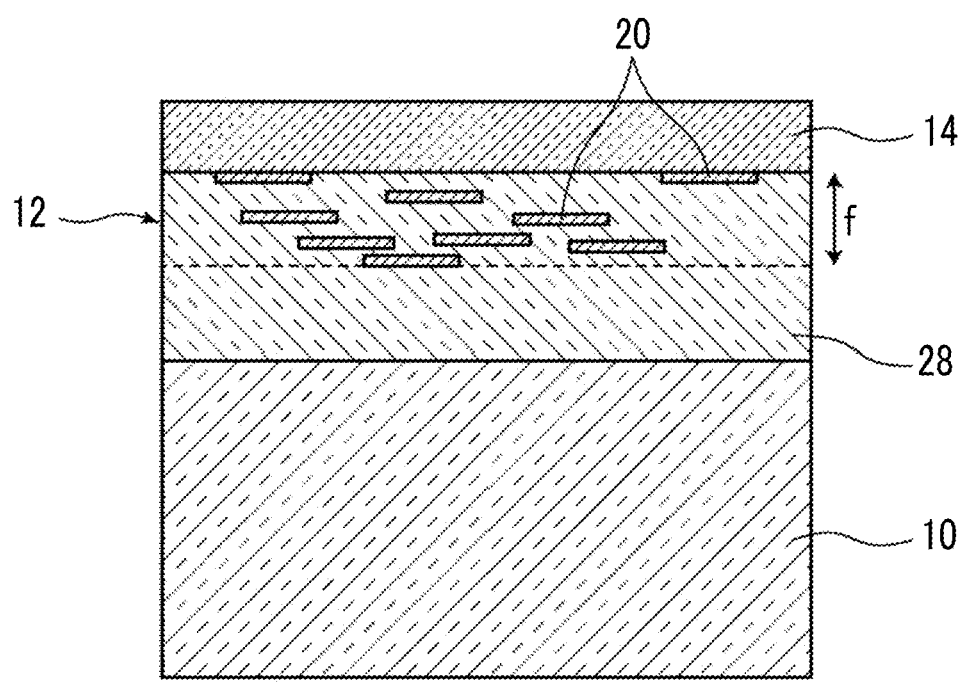
FIG. 4 is a schematic cross-sectional view illustrating an example of a presence state of flat metal particles 20 in a high refractive index layer 12.

FIG. 4 is a schematic cross-sectional view illustrating an example of a presence state of the flat metal particles 20 in the high refractive index layer 12 with respect to the high refractive index film according to the present disclosure.

In FIG. 4, the high refractive index layer 12 is present between a low refractive index layer 28 including the same binder as the high refractive index layer 12 and the low refractive index layer 14 including a material different from the high refractive index layer 12.

As the coating thickness is reduced, an angle range of the plane orientation of the flat metal particles easily comes close to 0° such that the refractive index further increases, and thus a thickness f of the high refractive index layer 12 in the high refractive index film according to the present disclosure is preferably 2,000 nm or less, more preferably 10 nm to 1,000 nm, and particularly preferably 20 nm to 500 nm.

The boundary between the high refractive index layer and the low refractive index layer can be determined by observation with a scanning electron microscope (SEM), and the thickness f of the high refractive index layer can be determined. Even in a case where the low refractive index layer that is in contact with the high refractive index layer is formed by using a binder of the same kind as the binder included in the high refractive index layer, like the high refractive index layer 12 and the low refractive index layer 28 in FIG. 4, a boundary with the high refractive index layer can be determined by the image observed by a SEM, and thus the thickness f of the high refractive index layer can be determined. In the case where the boundary is not clear, as illustrated by the dotted line in FIG. 4, with respect to the interface on a side close to the base material, a flat surface which is parallel to the surface of the base material and includes the center of a flat metal particle closest to the outermost surface is regarded as a boundary, and with respect to the interface on a side far from the base material, a flat surface which is parallel to the surface of the base material and includes the center of a flat metal particle farthest from the outermost surface as a boundary.

<Base Material>

The high refractive index film according to the present disclosure is a high refractive index film having a base material and a high refractive index layer formed on the base material.

The base material is not particularly limited, and it is preferable to use a base material having high transmittance to infrared light. However, in a case of using an application in which transparency is not required, as a high reflection film or the like, a base material having a low transmittance can be suitably used.

Examples of the base material having high transmittance with respect to infrared light include a base material having a transmittance of 50% or more to infrared light having any wavelength in the range of 780 nm to 25 μm.

As the base material having a high transmittance to infrared light, examples of inorganic materials include silicon, germanium, chalcogenide glass, quartz glass, sapphire, calcium fluoride, barium fluoride, magnesium fluoride, zinc selenide, zinc sulfide, and diamond.

Particularly, it is preferable to use silicon, germanium, chalcogenide glass, quartz glass, and the like, which have high infrared transmittance and excellent environmental resistance.

Examples of the base material having a high transmittance to infrared light include a film formed of, as inorganic materials, a polyolefin-based resin such as a polyolefin-based resin, a cyclic polyolefin resin, poly(4-methylpentene-1), and polybutene-1; a polyester-based resin such as polyethylene terephthalate and polyethylene naphthalate; a polycarbonate-based resin, a polyvinyl chloride-based resin, a polyphenylene sulfide-based resin, a polyether sulfone-based resin, a polyethylene sulfide-based resin, a polyphenylene ether-based resin, a styrene-based resin, an acrylic resin, a polyamide-based resin, a polyimide-based resin, and a cellulose-based resin such as cellulose acetate, or a laminated film thereof. Among these, a polyolefin-based resin film and a cyclic polyolefin resin film are preferable. Specific commercially available products can be preferably used, and specific examples thereof include ARTON manufactured by JSR Corporation, ZEONEX manufactured by Zeon Corporation, and TOPAS manufactured by Polyplastics Co., Ltd.

<Low Refractive Index Layer>

The low refractive index layer is not particularly limited, as long as the refractive index thereof is smaller than the refractive index of the high refractive index layer, and the layer can be selected according to the purpose.

With respect to the refractive index of the low refractive index layer, the refractive index in the wavelength of 10 μm is preferably less than 3, more preferably less than 2, and even more preferably less than 1.7.

The lower limit of the refractive index is not particularly limited, and may be 1 or more.

With respect to the low refractive index layer used in the present disclosure, according to the applications, it is preferable that a refractive index in a wavelength of 5 μm to 15 μm is in the above range, it is more preferable that a refractive index in a wavelength of 2 μm to 15 μm is in the above range, and it is even more preferable that a refractive index in a wavelength of 780 nm to 15 μm is in the above range.

The refractive index is measured based on a multiple reflection theory and Fresnel interference theory by measuring spectral reflectance and spectral transmittance with a Fourier transform infrared spectrophotometer (FTIR).

The material of constituting the low refractive index layer is not particularly limited, and examples thereof include components similar to the binder included in the high refractive index layer.

In a case where the high refractive index film according to the present disclosure has a low refractive index layer, it is possible to use the high refractive index film according to the present disclosure as an optical interference film.

A preferable layer configuration in a case where the high refractive index film has a low refractive index layer is changed according to the applications of the optical interference film and thus is described below.

<Other Layers>

The high refractive index film according to the present disclosure may have other layers.

Examples of the other layers include pressure sensitive adhesive layers, hard coat layers, back coat layers disclosed in paragraphs 0075 to 0080 of JP2015-129909A. Examples of the other layers include an ultraviolet absorbing layer, and an antifouling layer.

<Method of Manufacturing High Refractive Index Film>

Since the method of manufacturing the high refractive index film according to the present disclosure can be performed by a liquid phase method, the time required for production is short, and special equipment and the like necessary for film formation by a vapor phase method are not required, and thus the method has high productivity.

The method of manufacturing the high refractive index film according to the present disclosure is not particularly limited, as long as the method is performed by a liquid phase method, but examples of the embodiment include a method including a step (coating step) of coating a base material with a coating solution for forming a high refractive index layer and a step (drying step) of drying the coated coating solution for forming a high refractive index layer, if necessary.

In this manner, film formation by coating with a coating solution is a very simple method, and there are many accumulations of technical methods and the like in various fields, so the method has high productivity.

[Coating Step]

The coating method in the coating step is not particularly limited, and well-known method s can be used.

Examples of the coating method include methods of performing plane orientation by coating methods using a spin coater, a dip coater, a die coater, a slit coater, a bar coater, and a gravure coater, a Langmuir-Blodgett (LB) film method, a self-assembly method, and a spray coating.

—Coating Solution for Forming High Refractive Index Layer—

The coating solution for forming a high refractive index layer preferably includes flat metal particles and a binder, and may further contain a well-known solvent, a known additive, and the like.

The flat metal particles are preferably dispersed in the coating solution.

The coating solution for forming a high refractive index layer may include a raw material of a binder. Examples of the raw material of the binder include a polymerizable compound and a polymerization initiator, and particularly, in a case where the polymerizable compound and the polymerization initiator are contained, it is possible to form a pattern on the high refractive index layer by exposure.

In a case where the coating solution for forming a high refractive index layer includes the raw material of the binder, the method of manufacturing the high refractive index film according to the present disclosure preferably further include a step of forming a binder.

In the step of forming the binder, for example, a method of curing at least a portion of the coated coating solution for forming a high refractive index layer by exposure or heating by a well-known method is performed.

[Drying step]

As a drying method in the drying step, a well-known drying method is used without particular limitation. Examples thereof include heat drying under natural pressure or under reduced pressure, and natural drying. The method of heating include the heat drying is not particularly limited, and examples thereof include a heating method by using a device such as a hot plate or an oven.

[Step of Forming Low Refractive Index Layer]

The method of manufacturing the high refractive index film according to the present disclosure may further include a step (a step of forming a low refractive index layer) of forming the low refractive index layer.

Examples of the step of forming a low refractive index layer include a method of coating a coating solution for forming the low refractive index layer by the same method as the above coating step, and drying the coating solution by the same method as the above drying step.

Examples of the coating solution for forming the low refractive index layer include a solution obtained by dissolving a material constituting the low refractive index layer described above in a well-known solvent.

(Optical Interference Film)

The high refractive index film according to the present disclosure is preferably an optical interference film.

In a case where the high refractive index layer is formed as a single layer or a lamination structure combined with another low refractive index layer, the high refractive index film according to the present disclosure can be suitably used as an optical interference film to infrared light. Another preferable aspect is to form the high refractive index layer, the low refractive index layer, and the like on the base material.

Examples of the optical interference film include an interference filter such as an antireflection film, a high reflection film, a band pass filter, a long pass filter, and a short pass filter.

<Antireflection Film>

The optical interference film according to the present disclosure is preferably an antireflection film.

The antireflection film may have any configuration as long as the antireflection film includes the high refractive index layer according to the present disclosure, for example, the antireflection film may be an antireflection film of a single layer, which has the high refractive index layer on the base material, may be an antireflection film having a two-layer structure, which has the high refractive index layer and the low refractive index layer in this order, on the base material, and may be an antireflection film having a three-layer structure, which has the low refractive index layer, the high refractive index layer, and the low refractive index layer in this order, on the base material.

Figure 5:
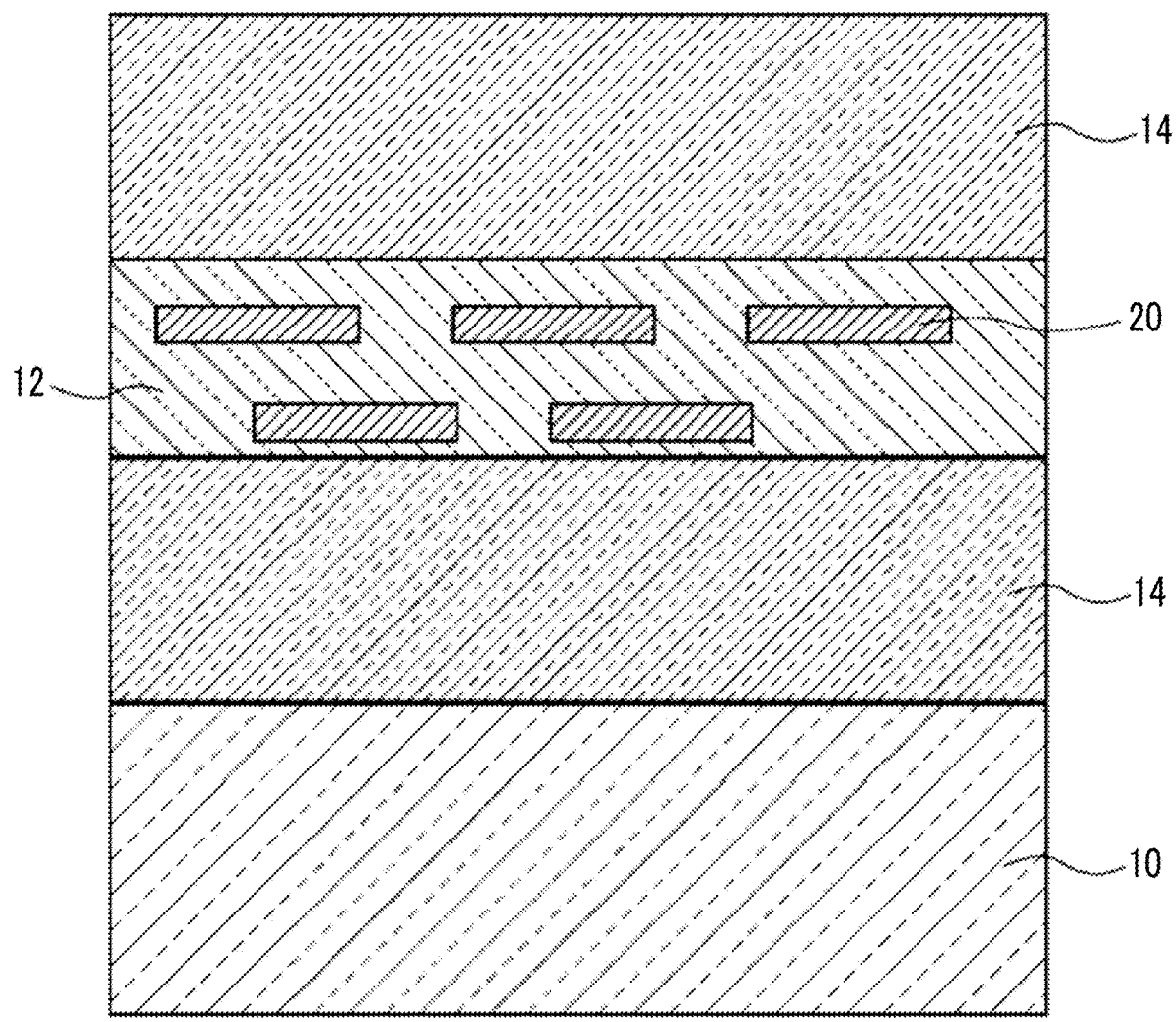
FIG. 5 is a schematic view illustrating an example of an optical interference film according to the present disclosure which is an antireflection film.

FIG. 5 illustrates an example of an optical interference film according to the present disclosure which is an antireflection film having a three-layer structure.

In FIG. 5, the low refractive index layer 14, the high refractive index layer 12 including the flat metal particles 20, and the low refractive index layer 14 are provided on the base material 10, in this order.

In the layer configuration, it is possible to design a desired antireflective film by adjusting the film thickness and the refractive index of each layer.

<High Reflection Film>

The optical interference film according to the present disclosure is preferably a high reflection film.

The high reflection film may have any configuration, as long as the high reflection film includes the high refractive index layer according to the present disclosure, and the high reflection film may be a high reflection film of a single layer having the high refractive index layer on the base material, may be a high reflection film having a two-layer structure, which has the high refractive index layer and the low refractive index layer on the base material, and may be a high reflection film having a three-layer structure, which has the low refractive index layer, the high refractive index layer, and the low refractive index layer on the base material.

Figure 6:
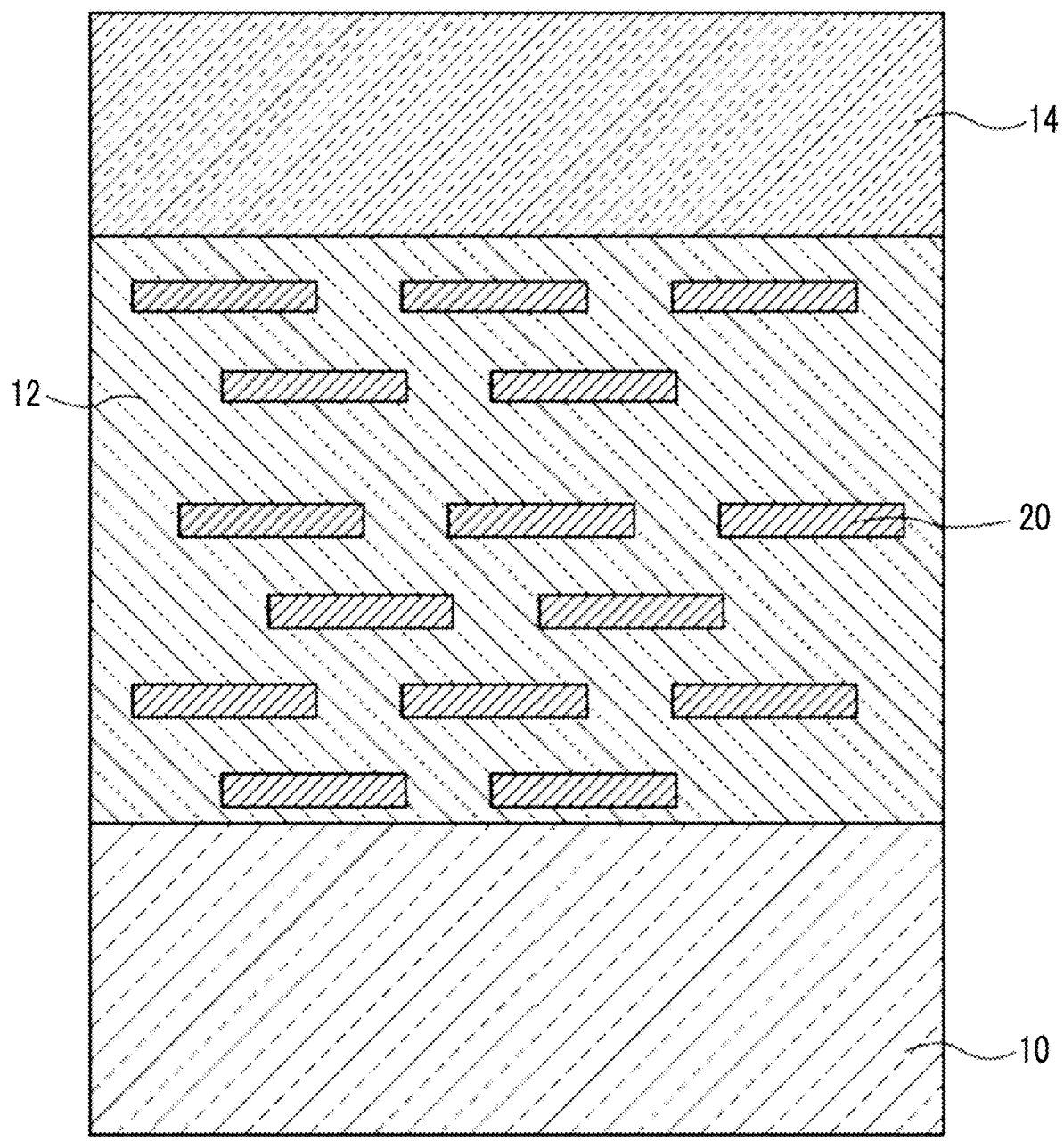
FIG. 6 is a schematic view illustrating an example of an optical interference film according to the present disclosure which is a high reflection film.

FIG. 6 illustrates an example of an optical interference film according to the present disclosure which is a high reflection film.

In FIG. 6, the high refractive index layer 12 including the flat metal particles 20 and the low refractive index layer 14 are provided on the base material 10, in this order.

In the configuration, by adjusting the film thickness and the refractive index of each layer, it is possible to design a desired high reflection film.

<Band Pass Filter and Long Pass Filter>

The optical interference film according to the present disclosure is preferably a band pass filter or a long pass filter.

The band pass filter or the long pass filter may have any configuration, as long as the pass filter includes the high refractive index layer according to the present disclosure, and for example, it is preferable to have a layer structure in which the two-layer structure having the high refractive index layer and the low refractive index layer is repeated a plurality of times on the base material.

Figure 7:
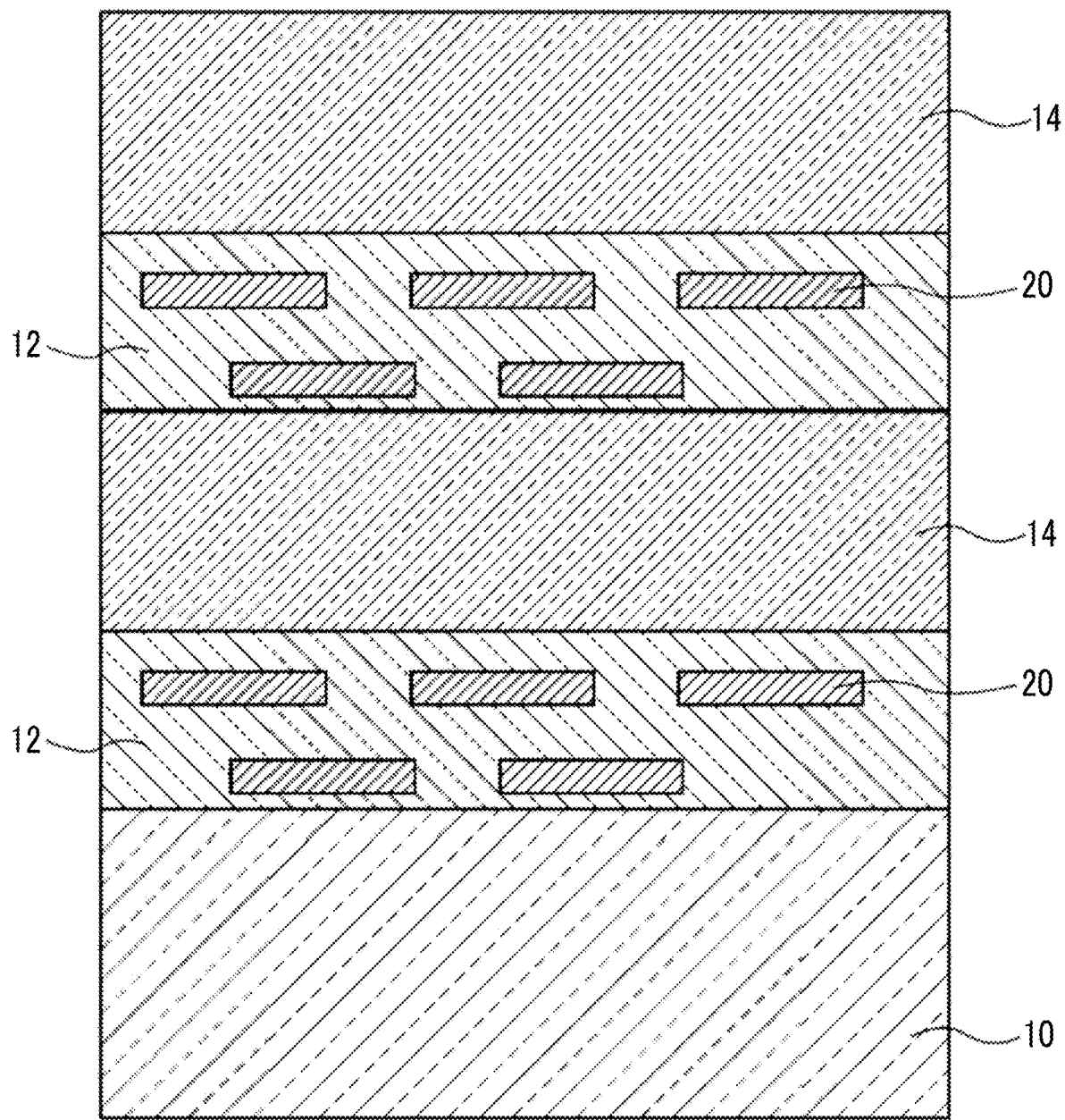
FIG. 7 is a schematic diagram illustrating an example of an optical interference film according to the present disclosure which is a long pass filter or a band pass filter.

FIG. 7 is an example of the optical interference film according to the present disclosure which is a long pass filter or a band pass filter.

In FIG. 7, on the base material 10, the two-layer structure having the high refractive index layer 12 including the flat metal particles 20 and the low refractive index layer 14 is repeated twice.

In FIG. 7, the two-layer structure having the high refractive index layer 12 and the low refractive index layer 14 is repeated twice, but may be repeated three or more times.

In the layer configuration, it is possible to design a desired band pass filter or long pass filter by adjusting the film thickness and the refractive index of each layer.

EXAMPLES

Hereinafter, the present disclosure is specifically described with reference to examples. The materials, amounts used, proportions, treatment contents, treatment procedures and the like presented in the following examples can be appropriately changed without departing from the gist of the embodiments of the present disclosure. Accordingly, the scope of the embodiments of the present disclosure is not limited to the specific examples described below. In the examples, "parts" and "%" mean "parts by mass" and "mass %" unless otherwise described.

<Single-Layer Film Simulation Result>
[Evaluation on aspect ratio of flat metal particle]

The refractive index analysis of the high refractive index film was performed by the FDTD method (Finite-difference time-domain method).

A space of the area of X axis 1 μm×Y axis 1 μm×Z axis 2.1 μm was divided at 0.005 μm intervals, and the electromagnetic field in each area was calculated.

As boundary conditions in the X-axis and Y-axis directions, periodic boundary conditions were applied, and as boundary conditions in the Z-axis direction, perfect absorption boundary conditions were applied.

In an area having a thickness of 0.1 μm in the Z-axis direction in a medium with a refractive index of 1.5 at a wavelength of 10 μm, a shape, an average particle diameter, an average thickness, a value (aspect ratio) obtained by dividing an average particle diameter D of the flat metal particles by the average thickness T, a volume fraction, and a structure in which particles of the material are randomly plane-oriented and dispersed, as presented in Table 1, were analyzed. The area having a thickness of 0.1 μm corresponds to the high refractive index layer.

Figure 8:
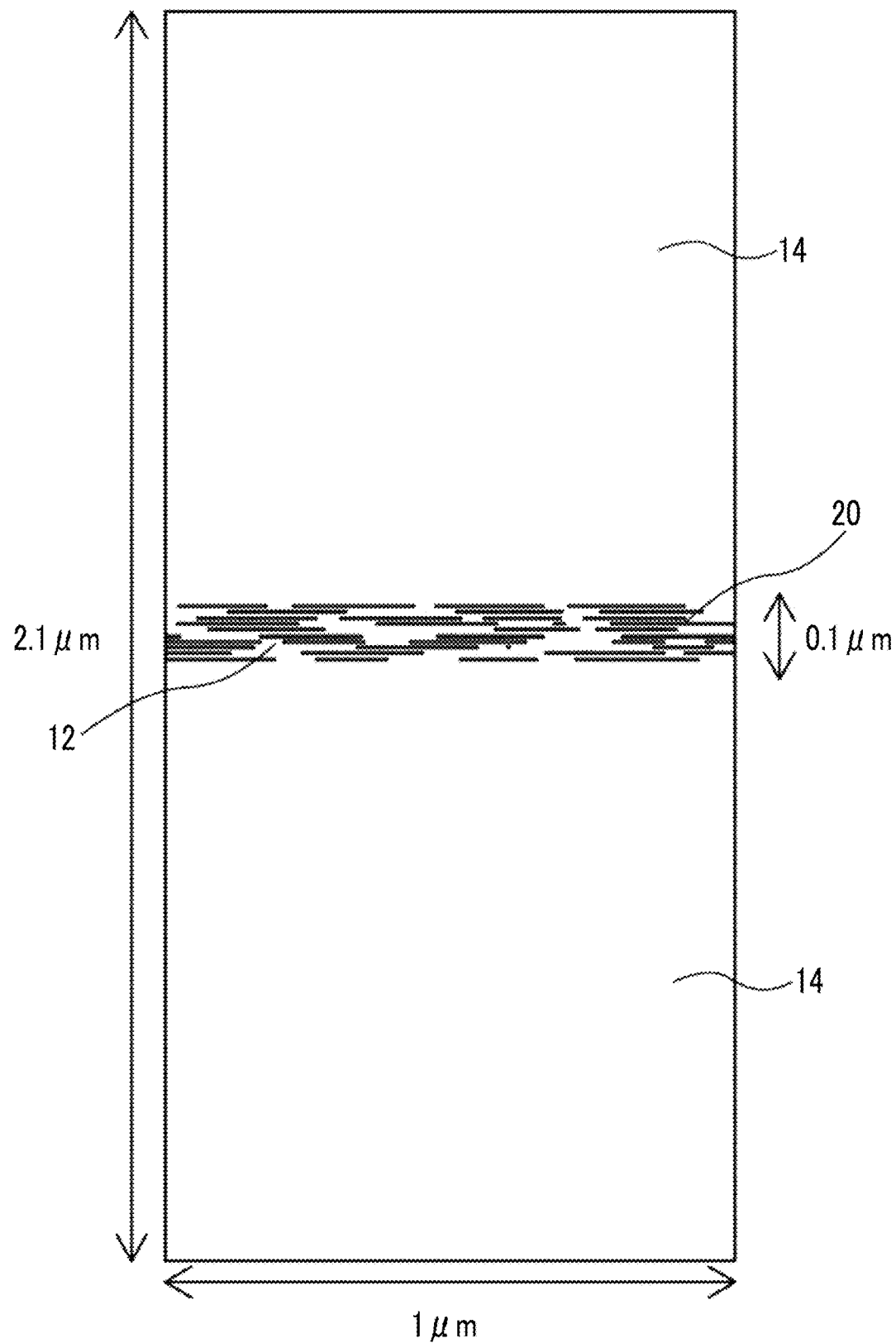
FIG. 8 is a schematic cross-sectional view of a structure of a high refractive index film according to Example A11.
Figure 9:
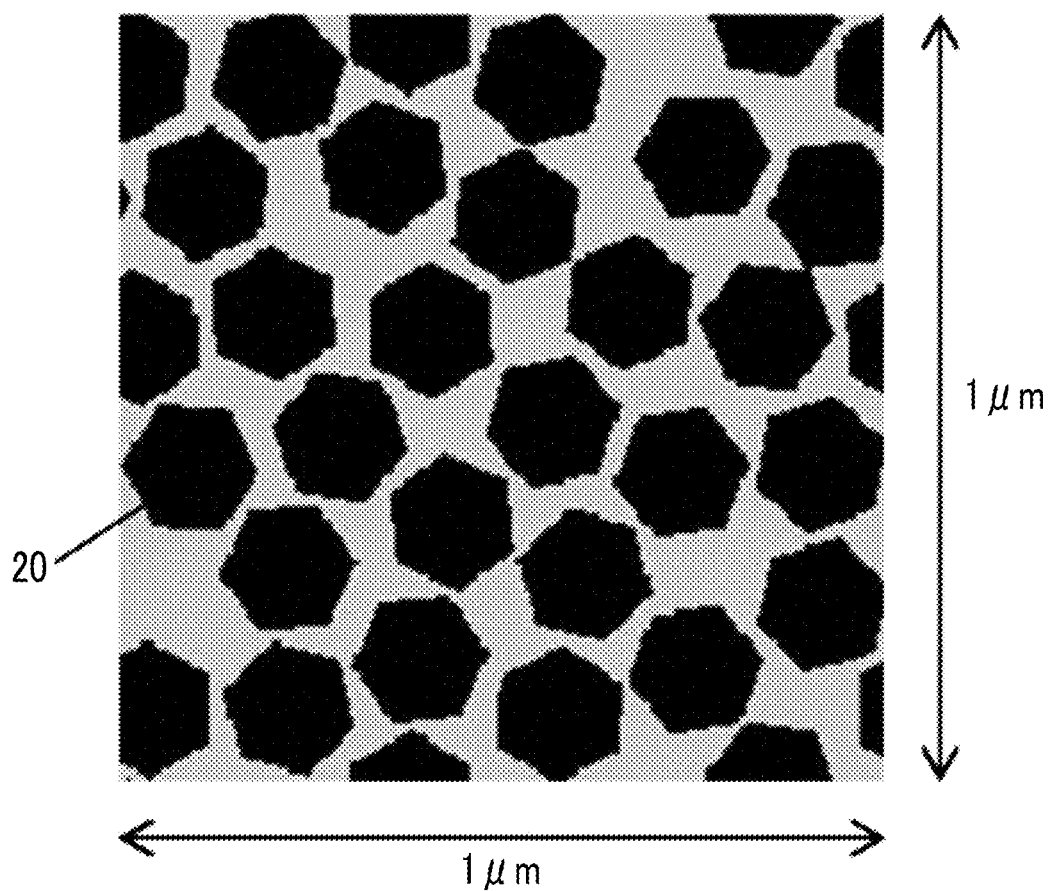
FIG. 9 is a schematic top view of a structure of the high refractive index film according to Example A11.

For example, a schematic cross-sectional view of the structure of a polymer film according to Example A11 is illustrated in FIG. 8, and a schematic top view thereof is illustrated in FIG. 9.

A plane wave having a wavelength of 10 μm is incident from the Z axis origin on each of the high refractive index films presented in Table 1, and the refractive index of the high refractive index layer at a wavelength of 10 μm was derived by using the method disclosed in D. R. Smith et. al., Phys. Rev. B65, 195104 (2002).

The results of the research on various particles having different aspect ratios are presented in Table 1 (Examples A1 to A7 and Comparative Examples A1 to A3).

In Table 1, the expression of "flat hexagonal shape" in the column of the flat metal particles means that both of the two main planes of the flat metal particle are regular hexagons.

TABLE 1

| | Shape of flat metal particle | Average particle diameter (μm) | Average thickness of flat metal particles (nm) | Aspect ratio | Volume fraction (volume %) | Material of flat metal particles | Plane orientation (°) | Plasmon resonance wavelength (nm) | Refractive index (10 μm) |
|---|---|---|---|---|---|---|---|---|---|
| Example A1 | Flat hexagonal shape | 30 | 10 | 3 | 20 | Ag | 0 | 520 | 3.0 |
| Example A2 | Flat hexagonal shape | 40 | 10 | 4 | 20 | Ag | 0 | 560 | 3.2 |
| Example A3 | Flat hexagonal shape | 50 | 10 | 5 | 20 | Ag | 0 | 700 | 3.4 |
| Example A4 | Flat hexagonal shape | 100 | 10 | 10 | 20 | Ag | 0 | 900 | 4.2 |
| Example A5 | Flat hexagonal shape | 150 | 10 | 15 | 20 | Ag | 0 | 1100 | 4.8 |
| Example A6 | Flat hexagonal shape | 250 | 10 | 25 | 20 | Ag | 0 | 1400 | 6.0 |
| Example A7 | Flat hexagonal shape | 300 | 20 | 15 | 20 | Ag | 0 | 1150 | 5.0 |
| Comparative Example A1 | Flat hexagonal shape | 10 | 10 | 1 | 20 | Ag | 0 | 440 | 2.2 |
| Comparative Example A2 | Flat hexagonal shape | 20 | 10 | 2 | 20 | Ag | 0 | 480 | 2.6 |
| Comparative Example A3 | Spherical shape | 20 | 20 | 1 | 20 | Ag | 0 | 440 | 2.3 |

As described in Example A1 to A7, it has been found that, in a case where the aspect ratio is more than 3, it is possible to form a high refractive index film having a refractive index of more than 3. Meanwhile, it has been found that, as presented in Comparative Examples A1 to A3, in a case where the aspect ratio was less than 3, it was not possible to obtain a refractive index of more than 3.

Figure 10:
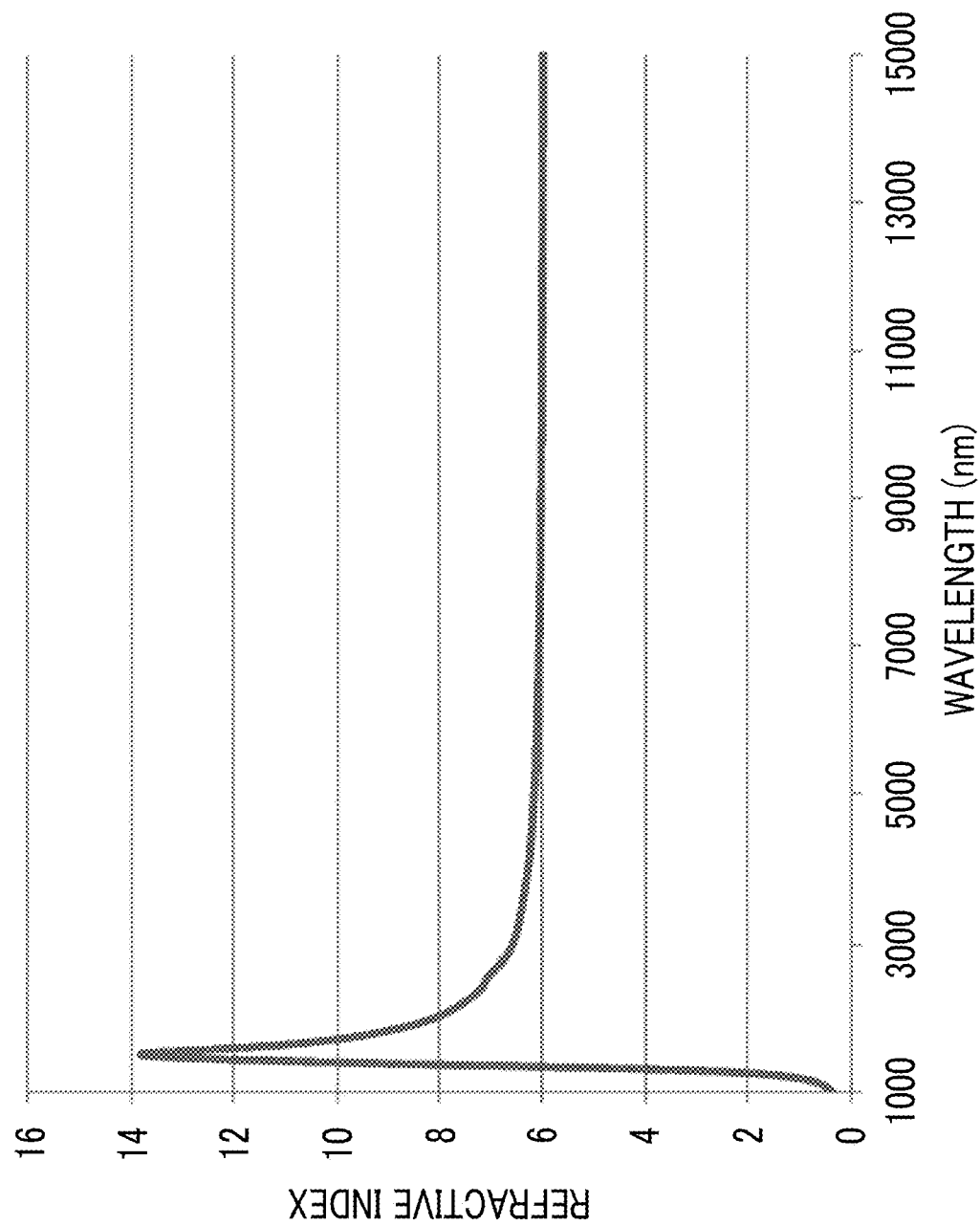
FIG. 10 is a graph presenting wavelength dispersion characteristics of a refractive index of a high refractive index film according to Example A6.

With respect to the structure of the high refractive index film according to Example A6, the wavelength dispersion characteristics of the refractive index of the high refractive index film are illustrated in FIG. 10. It has been found that there is an area in which the refractive index is specifically increased due to plasmon resonance around the wavelengths of 1,000 nm to 2,000 nm. It has been found that the refractive index characteristics are substantially flat at least up to around 50 μm in the area on a longer wavelength side than this, and thus it is possible to obtain a refractive index of 3 or more.

[Evaluation on Volume Fraction of Flat Metal Particles]

Models having different volume fractions of the flat metal particles were manufactured and researched, and the results of examination are described in Examples A1 and A8 to A11 and Comparative Examples A4 and A5.

In Examples A8 to A11 and Comparative Examples A4 and A5, the volume fraction of the flat metal particles was changed as presented in Table 2. The refractive index analysis by the FDTD method was performed by the same method as that of Examples A1 to A7 and Comparative Examples A1 to A3.

The evaluation results were presented in Table 2.

In Table 2, the description of "-" described in the column of the shape of the flat metal particles and the like indicates that the flat metal particles are not contained.

TABLE 2

| | Shape of flat metal particle | Average particle diameter (μm) | Average thickness of flat metal particles (nm) | Aspect ratio | Volume fraction (volume %) | Material of flat metal particles | Plane orientation (°) | Plasmon resonance wavelength (nm) | Refractive index (10 μm) |
|---|---|---|---|---|---|---|---|---|---|
| Example A1 | Flat hexagonal shape | 30 | 10 | 3 | 20 | Ag | 0 | 520 | 3.0 |
| Example A8 | Flat hexagonal shape | 30 | 10 | 3 | 30 | Ag | 0 | 600 | 3.6 |
| Example A9 | Flat hexagonal shape | 30 | 10 | 3 | 45 | Ag | 0 | 700 | 4.6 |
| Example A10 | Flat hexagonal shape | 30 | 10 | 3 | 60 | Ag | 0 | 800 | 6.0 |
| Example A11 | Flat hexagonal shape | 150 | 10 | 15 | 45 | Ag | 0 | 1300 | 8.3 |
| Comparative Example A4 | — | — | — | — | — | — | — | — | 1.5 |
| Comparative Example A5 | Flat hexagonal shape | 30 | 10 | 3 | 10 | Ag | 0 | 480 | 1.9 |

[Evaluation on Shape of Flat Metal Particle]

The results of research on various flat metal particles having different shapes are described in Examples A5 and A12 to A14.

In Examples A12 to A14, shapes of the flat metal particles were changed as described in Table 3. The refractive index analysis by the FDTD method was performed by the same method as that of Examples A1 to A7 and Comparative Examples A1 to A3.

The evaluation results were presented in Table 3.

In Table 3, the expression "flat triangular shape" in the column of the shape of the flat metal particle means that both of the two main planes of the flat metal particle have an equilateral triangular shape, the expression "flat octagonal shape" means that both of the two main planes of the flat metal particle have a regular octagonal shape, and the expression "flat circular shape" means that both of the two main planes of the flat metal particle have a circular shape.

TABLE 3

| | Shape of flat metal particle | Average particle diameter (μm) | Average thickness of flat metal particles (nm) | Aspect ratio | Volume fraction (volume %) | Material of flat metal particles | Plane orientation (°) | Plasmon resonance wavelength (nm) | Refractive index (10 μm) |
|---|---|---|---|---|---|---|---|---|---|
| Example A5 | Flat hexagonal shape | 150 | 10 | 15 | 30 | Ag | 0 | 1100 | 4.8 |
| Example A12 | Flat hexagonal shape | 150 | 10 | 15 | 30 | Ag | 0 | 1100 | 4.0 |
| Example A13 | Flat hexagonal shape | 150 | 10 | 15 | 30 | Ag | 0 | 1100 | 4.94 |
| Example A14 | Flat circular shape | 150 | 10 | 15 | 30 | Ag | 0 | 1150 | 5.2 |

As described in Example A5 and A8 to A14, it has been found that, in a case where the shape of the main plane is a polygonal shape, it is possible to obtain a high refractive index film having a refractive index of more than 3. Particularly, as presented in A5, A13, and A14, it was found that, in a case where the shape is a hexagonal or higher polygonal shape or a circular shape, particularly the refractive index increases.

[Evaluation on Material of Flat Metal Particles]

The results of research on various particles of different materials are described in Examples A5 and A15 to A17, and Comparative Example A6.

In Examples A15 to A17 and Comparative Example A6, materials of the flat metal particles were changed as presented in Table 4. The refractive index analysis by the FDTD method was performed by the same method as that of Examples A1 to A7 and Comparative Examples A1 to A3 described above.

The evaluation results were presented in Table 4.

TABLE 4

|  | Shape of flat metal particle | Average particle diameter (μm) | Average thickness of flat metal particles (nm) | Aspect ratio | Volume fraction (volume %) | Material of flat metal particles | Plane orientation (°) | Plasmon resonance wavelength (nm) | Refractive index (10 μm) |
|---|---|---|---|---|---|---|---|---|---|
| Example A5 | Flat hexagonal shape | 150 | 10 | 15 | 20 | Ag | 0 | 1100 | 4.8 |
| Example A15 | Flat hexagonal shape | 150 | 10 | 15 | 20 | Au | 0 | 1050 | 4.5 |
| Example A16 | Flat hexagonal shape | 150 | 10 | 15 | 20 | Cu | 0 | 800 | 4.3 |
| Example A17 | Flat hexagonal shape | 150 | 10 | 15 | 20 | Al | 0 | 700 | 4.1 |
| Comparative Example A6 | Flat hexagonal shape | 150 | 10 | 15 | 20 | $SiO_2$ | 0 | — | 1.8 |

As described in Examples A5 and A15 to A17, it has been found that, in a case where metal particles of Ag, Au, Cu, and A1 were used, it is possible to obtain a high refractive index film having a refractive index of more than 3. Particularly, a refractive index was highest in a case where Ag was used. On the other hand, as described in Comparative Example A6, it has been found that, in a case where $SiO_2$ was used, it is not possible to obtain a refractive index of more than 3.

[Evaluation on Plane Orientation of Flat Metal Particle]

The results of research on a film in which particles having different degree of plane orientations are dispersed are described in Examples A5 and A18 and Comparative Example A7. The evaluation results were presented in Table 5. It has been found that, in a case where the degree of plane orientation was smaller than 30°, it is possible to form a high refractive index film having a refractive index of more than 3. Meanwhile, it has been found that, in a case where the plane orientation is not performed (the degree of plane orientation is larger than 30°), it is not possible to obtain a refractive index of more than 3.

boundary conditions in the Z axis direction, perfect absorption boundary conditions were applied.

[Antireflection Structure (Antireflection Film)]

As Example B1, the surface reflectance and the surface transmittance in a case where a plane wave having a wavelength of 10 μm was incident on the lamination structure described in Table 6 from the Z axis origin were evaluated. The evaluation results were presented in Table 6. The lamination structure was a structure having a first low refractive index layer (Layer 1), a high refractive index layer (Layer 2), and a second low refractive index layer (Layer 3) in this order on a base material. As the high refractive index layer (Layer 2), the high refractive index layer used in Example A6 was used.

It has been found that the antireflection film having the layer configuration in Example B1 has lower surface reflectance and simultaneously increased surface transmittance compared with the silicon substrate having none of Layers 1 to 3 as Comparative Example B1.

TABLE 5

|  | Shape of flat metal particle | Average particle diameter (μm) | Average thickness of flat metal particles (nm) | Aspect ratio | Volume fraction (volume %) | Material of flat metal particles | Plane orientation (°) | Plasmon resonance wavelength (nm) | Refractive index (10 μm) |
|---|---|---|---|---|---|---|---|---|---|
| Example A5 | Flat hexagonal shape | 150 | 10 | 15 | 20 | Ag | 0 | 1100 | 4.8 |
| Example A18 | Flat hexagonal shape | 150 | 10 | 15 | 20 | Ag | 20 | 900 | 4.0 |
| Comparative Example A7 | Flat hexagonal shape | 150 | 10 | 15 | 20 | Ag | 40 | — | 2.8 |

<Multilayer Simulation Result>

The refractive index analysis of the high refractive index film was performed by the FDTD method.

A space of the area of X axis 1 μm×Y axis 1 μm×Z axis 2.1 μm was divided at 0.005 μm intervals, and the electromagnetic field in each area was calculated.

A length of the area of the Z axis was appropriately changed according to the length of the multilayer film and calculated.

As boundary conditions in the X axis and Y axis directions, periodic boundary conditions were applied, and as The surface reflectance or the surface transmittance is calculated as the surface reflectance or the surface transmittance of infrared light having a wavelength of 10

Figure 11:
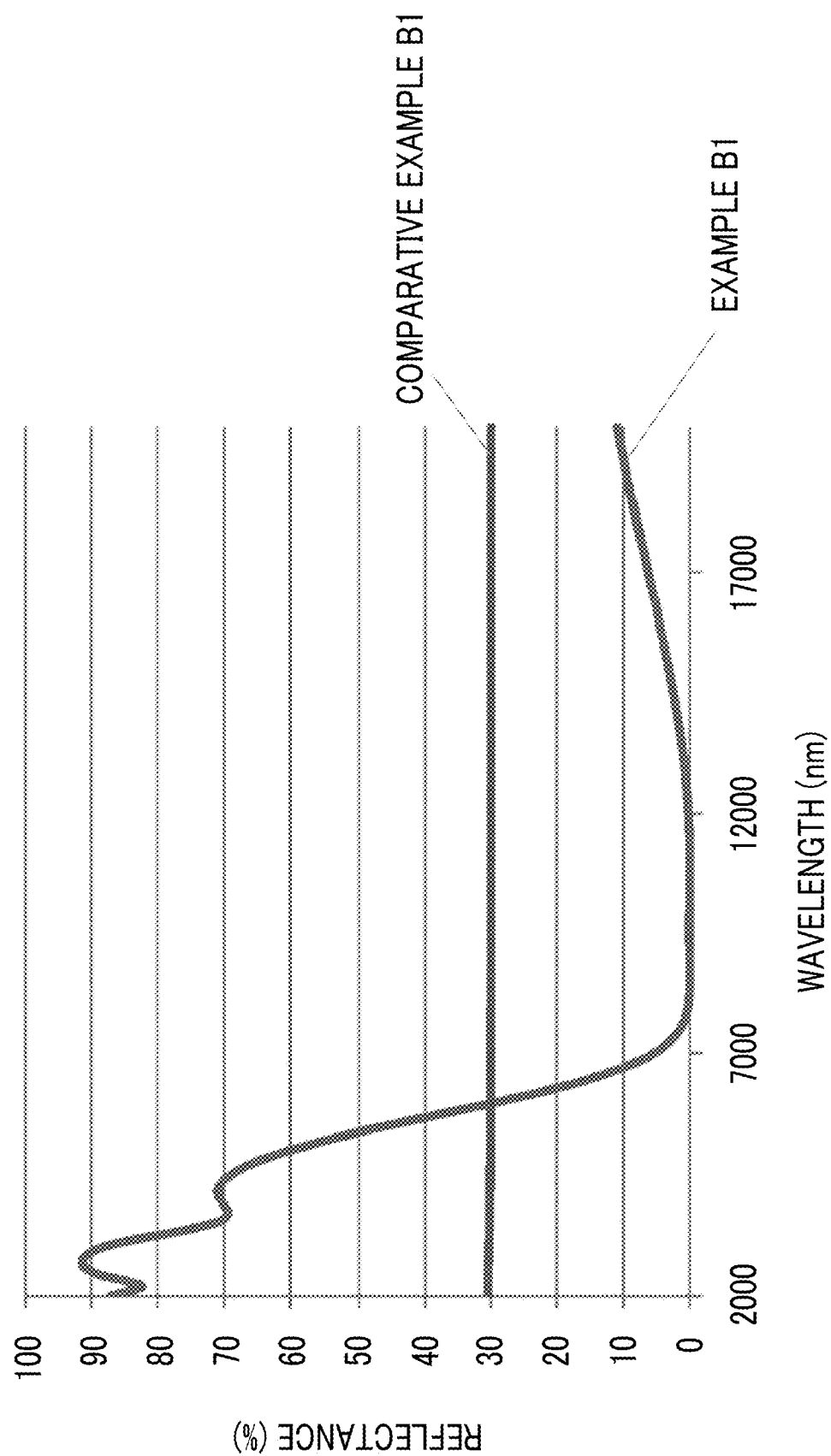
FIG. 11 is a graph presenting a surface reflection spectrum in an antireflection structure according to Example B1.
Figure 12:
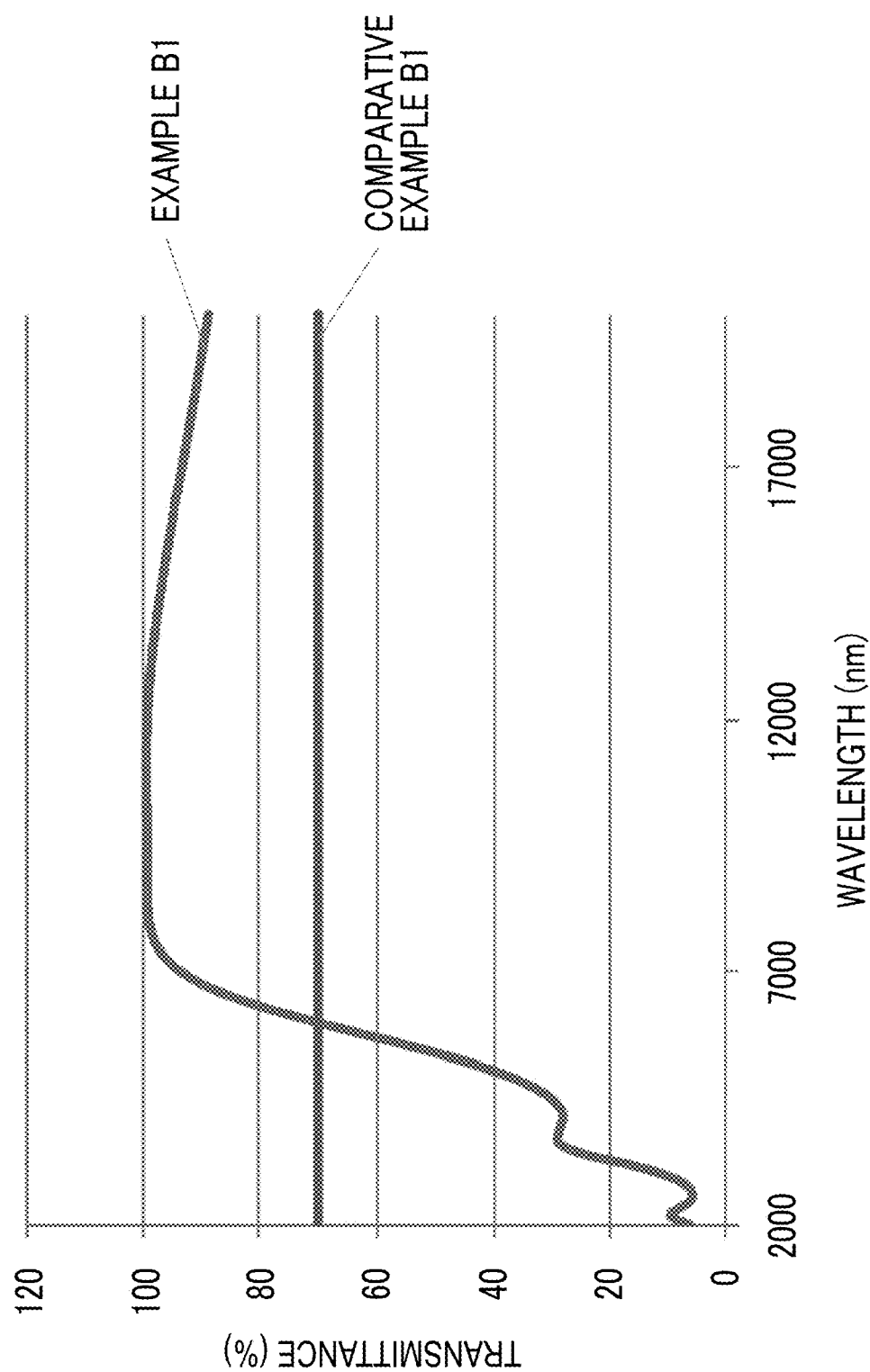
FIG. 12 is a graph presenting a surface transmission spectrum in the antireflection structure according to Example B1.

FIG. 11 illustrates a surface reflection spectrum according to the present structure, and FIG. 12 illustrates a surface transmission spectrum according to the present structure. It has been found that a high-band antireflection structure has smaller reflection and larger transmission, compared with the silicon substrate at least in a wavelength range of 7 μm to 25 μm.

TABLE 6

| | Base material | Refractive index of Layer 1 | Thickness of Layer 1 | Material of Layer 2 | Thickness of Layer 2 | Refractive index of Layer 3 | Thickness of Layer 3 | Surface reflectance (wavelength of 10 μm) | Surface transmittance (wavelength of 10 μm) |
|---|---|---|---|---|---|---|---|---|---|
| Example B1 | Silicon | 1.5 | 399 nm | Example A6 | 78 nm | 1.5 | 1834 nm | 0.10% | 99% |
| Comparative Example B1 | Silicon | — | — | — | — | — | — | 30% | 70% |

[High Reflection Structure (High Reflection Film)]

As Examples B2 to B3, with respect to the lamination structure presented in Table 7, the surface reflectance and the surface transmittance in a case where a plane wave having a wavelength of 10 μm was incident from the Z axis origin were evaluated. In Example B2, the structure which has the high refractive index layer used in Example A11 as a single layer on a base material was set. In Example B3, a structure which has the low refractive index layer (layer 1), the high refractive index layer (layer 2), and the low refractive index layer (layer 3) was set, and a structure which had the high refractive index layer used in Example A11 as the high refractive index layer (layer 2) was set.

In Examples B2 and B3, the reflection was greatly increased compared with the silicon substrate as Comparative Example B1, to obtain the high reflection structure.

The reflection was calculated as the surface reflectance or the surface reflectance of infrared light with a wavelength of 10 μm.

Figure 13:
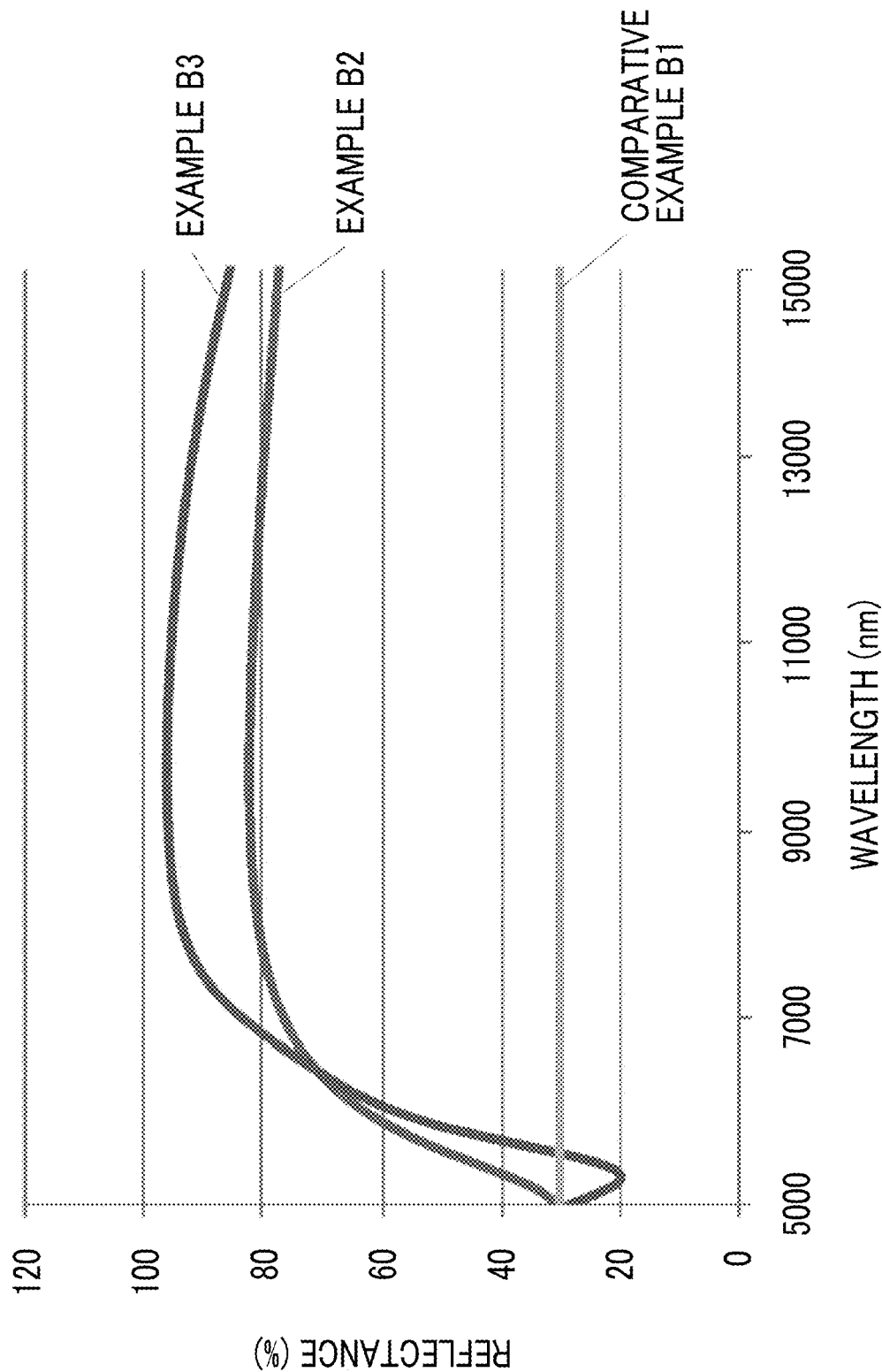
FIG. 13 is a graph presenting a surface reflection spectrum in a high reflection structure according to Example B2 or B3.

The surface reflection spectrum of the present structure was illustrated in FIG. 13. It has been found that a high band high reflection structure in which the reflection is larger than that of the silicon substrate at least in the wavelength range of 6 μm to 15 μm was obtained.

TABLE 7

| | Base material | Refractive index of Layer 1 | Thickness of Layer 1 | Material of Layer 2 | Thickness of Layer 2 | Refractive index of Layer 3 | Thickness of Layer 3 | Surface reflectance (wavelength of 10 μm) |
|---|---|---|---|---|---|---|---|---|
| Example B2 | Silicon | — | — | Example A11 | 289 nm | — | — | 82% |
| Example B3 | Silicon | n = 1.5 | 1606 nm | Example A11 | 287 nm | n = 1.5 | 3209 nm | 96% |
| Comparative Example B1 | Silicon | — | — | — | — | — | — | 30% |

[Band Pass Filter]

Figure 14:
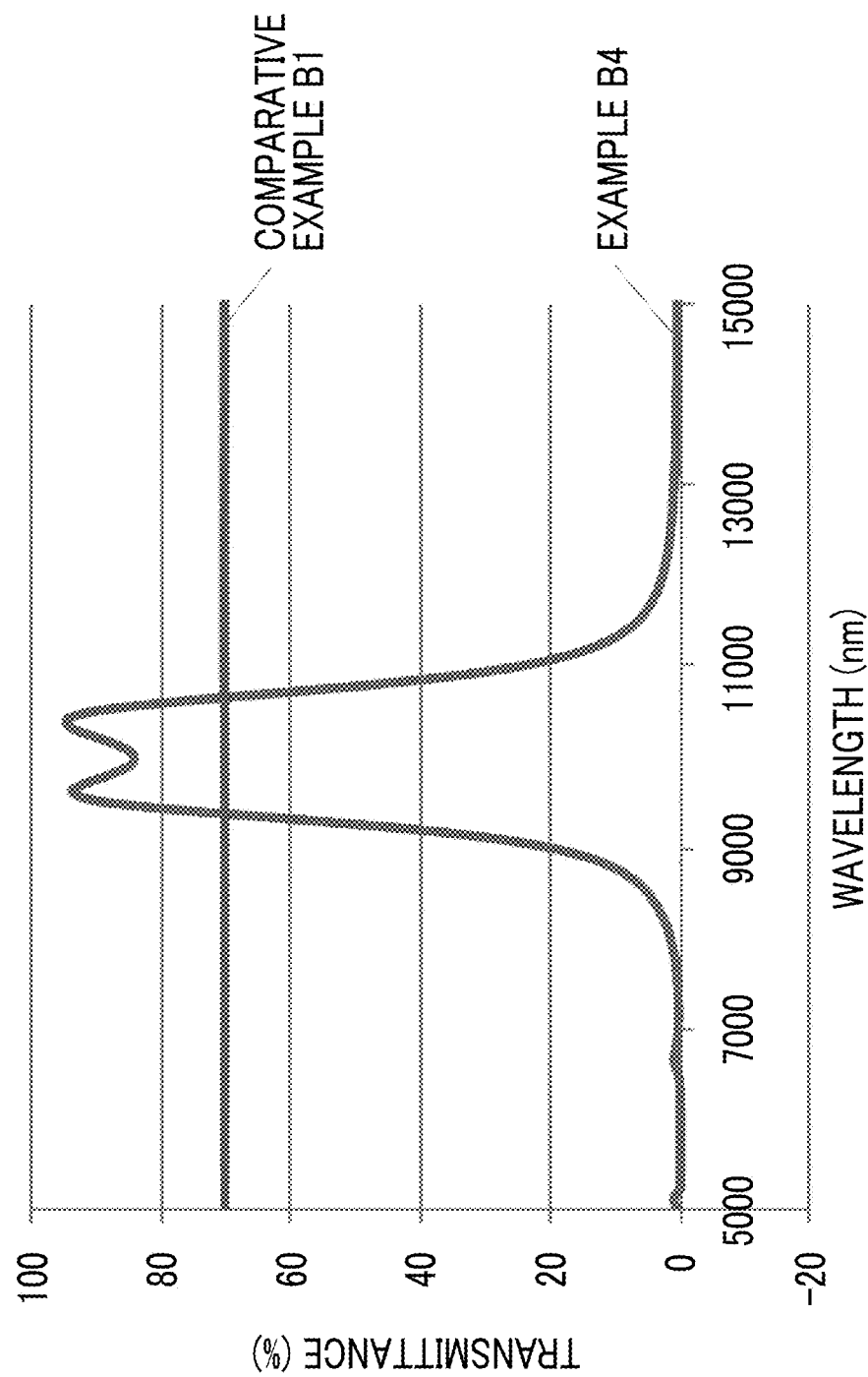
FIG. 14 is a graph presenting a surface transmission spectrum in a band pass filter according to Example B4.

As Example B4, with respect to the lamination structure presented in Table 8, the surface transmission spectrum of the present structure is illustrated in FIG. 14. The layer configuration was a configuration in which ten layers in total of the layers of high refractive index used in Example A11 and the layers of low refractive index having a refractive index of 1.5 were alternately stacked from the base material side. A band pass filter, which selectively transmits infrared light in the wavelength range around 9 μm to 11 μm, compared with Comparative Example B1 which had only a base material and did not have a low refractive index layer and a high refractive index layer was set.

TABLE 8

| | Silicon | Film thickness |
|---|---|---|
| Layer 1 | Example A11 | 515 nm |
| Layer 2 | n = 1.5 | 1320 nm |
| Layer 3 | Example A11 | 52 nm |
| Layer 4 | n = 1.5 | 666 nm |
| Layer 5 | Example A11 | 310 nm |

TABLE 8-continued

| | Silicon | Film thickness |
|---|---|---|
| Layer 6 | n = 1.5 | 833 nm |
| Layer 7 | Example A11 | 92 nm |
| Layer 8 | n = 1.5 | 314 nm |
| Layer 9 | Example A11 | 477 nm |
| Layer 10 | n = 1.5 | 2017 nm |
| — | Air | — |

[Long Pass Filter]

Figure 15:
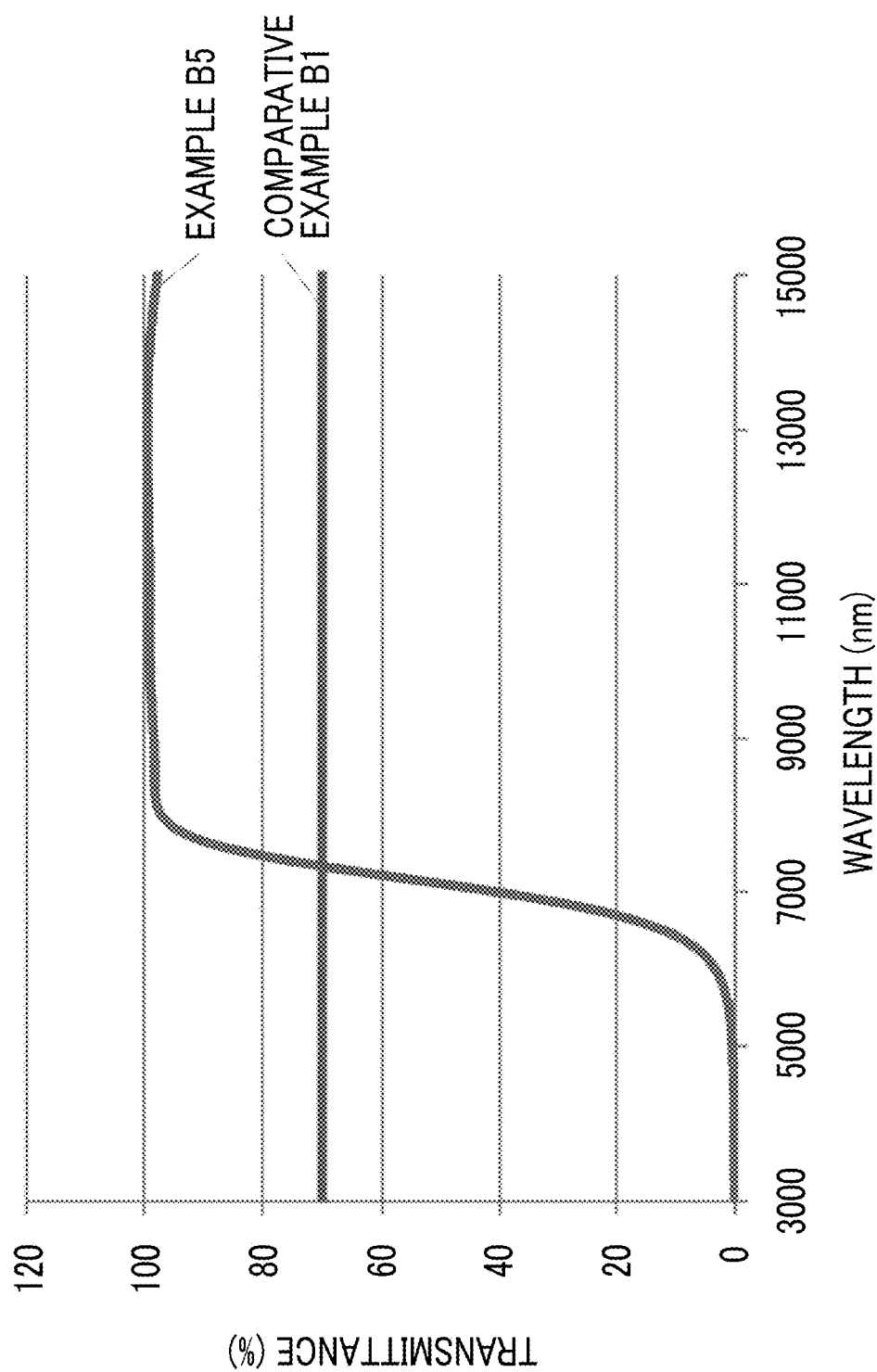
FIG. 15 is a graph presenting a surface transmission spectrum in a long pass filter according to Example B5.

As Example B5, with respect to the lamination structure presented in Table 9, the surface transmission spectrum of the present structure is illustrated in FIG. 15. The layer configuration was a configuration in which six layers in total of the layers of high refractive index used in Example A11 and the layers of low refractive index having a refractive index of 1.5 were alternately stacked from the base material side. A long pass filter, which selectively transmits wavelength longer than 7 compared with Comparative Example B1 which had only a base material and did not have a low refractive index layer and a high refractive index layer was set.

TABLE 9

| Base material | Silicon | Film thickness |
|---|---|---|
| Layer 1 | Example A11 | 71 nm |
| Layer 2 | n = 1.5 | 432 nm |
| Layer 3 | Example A11 | 120 nm |
| Layer 4 | n = 1.5 | 629 nm |
| Layer 5 | Example A11 | 61 nm |
| Layer 6 | n = 1.5 | 2006 nm |

<Result of Manufacturing High Refractive Index Film>

[Preparation of Flat Metal Particle Dispersion]

—Preparation of Flat Metal Particle Dispersion A1—

13 L of ion-exchanged water was weighed into a reaction vessel made of NTKR-4 (manufactured by Nippon Metal Industries Co., Ltd.), and was stirred by using a chamber equipped with an agitator with four propellers made of NTKR-4 and four paddles made of NTKR-4 attached to a shaft made of SUS316L, and 1.0 L of a 10 g/L trisodium citrate (anhydride) aqueous solution was added and kept at 35° C. 0.68 L of a 8.0 g/L polystyrene sulfonic acid aqueous solution was added, and 0.041 L of a sodium borohydride aqueous solution prepared to 23 g/L using a 0.04 mol/L sodium hydroxide aqueous solution was further added. 13 L of a 0.10 g/L silver nitrate aqueous solution was added at 5.0 L/min.

1.0 L of a 10 g/L trisodium citrate (anhydride) aqueous solution and 11 L of ion-exchanged water were added, and 0.68 L of a 80 g/L potassium hydroquinone sulfonate aqueous solution was further added. The stirring rate was raised to 800 rpm, 8.1 L of a 0.10 g/L silver nitrate aqueous solution was added at 0.95 L/min, and then the temperature was lowered to 30° C.

8.0 L of a 44 g/L methylhydroquinone aqueous solution was added, and then the total amount of a gelatin aqueous solution at 40° C. described below was added. The stirring was increased to 1,200 rpm, and the total amount of the silver sulfite white precipitate mixed solution described below was added.

In a stage where the pH change of the preparation liquid stopped, 5.0 L of a 1 mol/L NaOH aqueous solution was added at 0.33 L/min. After that, 0.078 L of 70 g/L of 1,2-benzisothiazolin-3-one (the aqueous solution was adjusted to be alkaline with NaOH and dissolved) was added. In this manner, the flat metal particle dispersion A1 was prepared.

—Preparation of Gelatin Aqueous Solution—

16.7 L of ion exchange water was weighed into a dissolution tank made of SUS316L. While low-speed stirring was performed with an SUS316L agitator, 1.4 kg of alkali-treated bovine bone gelatin (GPC weight-average molecular weight of 200,000) subjected to a deionized water treatment was added. 0.91 kg of alkali-treated bovine bone gelatin (GPC weight-average molecular weight of 210,000) subjected to a deionization treatment, a proteolytic enzyme treatment, and an oxidation treatment with hydrogen peroxide was added. Thereafter, the temperature was raised to 40° C., and swelling and dissolution of gelatin were simultaneously performed and completely dissolved.

—Preparation of Silver Sulfite White Precipitate Mixed Solution—

8.2 L of ion exchange water was weighed into a dissolution tank made of SUS316L, and 8.2 L of a silver nitrate aqueous solution of 100 g/L was added. While rapidly stirring with a SUS316L agitator, 2.7 L of a 140 g/L sodium sulfite aqueous solution was added in a short period of time to prepare a mixed solution including a white precipitate of silver sulfite. This mixed solution was prepared immediately before use.

—Preparation of Flat Metal Particle Dispersion B1—

800 g of the flat metal particle dispersion A1 described above was collected in a centrifuge tube and adjusted to a pH of 9.2±0.2 at 25° C. using a 1 mol/L sodium hydroxide aqueous solution or a 0.5 mol/L sulfuric acid. After a centrifugation operation at 9,000 rpm for 60 minutes at 35° C. using a centrifuge (manufactured by Himac Koki Co., Ltd., Himac CR22GIII, angle rotor R9A) was performed, 784 g of the supernatant was discarded. A 0.2 mmol/L NaOH aqueous solution was added to the precipitated flat sheet particles to make 400 g in total, and the mixture was stirred by hand using a stirring rod to obtain a crude dispersion. A coarse dispersion for 24 centrifuge tubes was prepared in the same operation as above to obtain 9,600 g in total, was added to a tank made of SUS316L, and was mixed. 10 cc of a 10 g/L solution of Pluronic 31R1 (manufactured by BASF SE) (diluted with a mixed solution of methanol:ion exchange water=1:1 (volume fraction)) was added. A batch-type dispersion treatment was performed on the crude dispersion mixture in the tank at 9,000 rpm for 120 minutes by using an automatic mixer type 20 (stirring portion: homomixer MARKII) manufactured by Primix Corporation. The liquid temperature during dispersion was maintained at 50° C. After 800 g of the dispersion obtained in this manner was again collected in a centrifuge tube, and subjected to a centrifugation operation at 9,000 rpm for 60 minutes at 35° C. using a centrifuge (manufactured by Himac Koki Co., Ltd., Himac CR22GIII, angle rotor R9A), 760 g of the supernatant was discarded. A 0.2 mmol/L sodium hydroxide aqueous solution was added to the precipitated flat sheet particles to make 800 g in total, and the mixture was stirred by hand using a stirring rod to obtain a crude dispersion. A coarse dispersion for 12 centrifuge tubes was prepared in the same operation as above to obtain 9,600 g in total, was added to a tank made of SUS316L, and was mixed. 10 mL of a 10 g/L solution of Pluronic 31R1 (manufactured by BASF SE) (diluted with a mixture liquid of methanol:ion exchanged water=1:1 (volume fraction)) was added. The crude dispersion mixture in the tank was subjected to a batch-type dispersion treatment at 9,000 rpm for 120 minutes by using an automatic mixer type 20 (stirring portion: homomixer MARKII) manufactured by Primix Corporation. The liquid temperature during dispersion was kept at 50° C. After the dispersion, the temperature was lowered to 25° C., and single pass filtration was performed using a profile II filter (manufactured by Nippon Pall Co., Ltd., product model MCY1001Y030H13).

In this manner, the flat metal particle dispersion A1 was subjected to a desalting treatment and a redispersion treatment to prepare a flat metal particle dispersion B1.

—Preparation of Flat Metal Particle Dispersions B2 to B4—

In the same manner, in the preparation of the flat metal particle dispersions A1 and B1, a concentration, a heating temperature, and pH of each solution in a case of preparation were adjusted such that a thickness, a diameter, and an aspect ratio were values presented in Table 10 so as to manufacture flat metal particle dispersions A2 and B2.

TABLE 10

|  | Average thickness | Average particle diameter | Aspect ratio | Plasmon resonance wavelength (nm) | Shape |
| --- | --- | --- | --- | --- | --- |
| A1 (B1) | 8 nm | 120 nm | 15 | 1,100 | Flat hexagonal shape |
| A2 (B2) | 10 nm | 260 nm | 26 | 1,400 | Flat hexagonal shape |

<Preparation of Coating Solution for Forming a High Refractive Index Layer>

Coating solution C1, C2, or C3 was prepared at the composition ratios of materials presented in Table 11. The numerical values in the table represent parts by mass.

Here, 2.78 L of a 0.1 mass % chloroauric acid aqueous solution (manufactured by Fujifilm Wako Pure Chemical Corporation) was added to 50 L of the coating solution C1, C2, or C3 and stirred for four hours at 60° C., so as to obtain a coating solution C1B, C2B, or C3B for forming a high refractive index layer.

TABLE 11

|  | Coating solution C1 | Coating solution C2 | Coating solution C3 |
| --- | --- | --- | --- |
| Polyurethane aqueous solution HYDRAN HW-350 (manufactured by DIC Corporation, solid content concentration 30 mass %) | 0.9 | 0.4 | 0.9 |
| Surfactant A: F series 8780P (manufactured by Lion Corporation, solid content 1 mass %) | 2.4 | 2.4 | 2.4 |
| Surfactant B: NAROACTY CL-95 (manufactured by Sanyo Chemical | 2.4 | 2.4 | 2.4 |

TABLE 11-continued

| | Coating solution C1 | Coating solution C2 | Coating solution C3 |
|---|---|---|---|
| Industries, solid content: 1 mass %) | | | |
| Surfactant C: (Sodium = 1,2-[bis(3,3,4,4,5,5,6,6,6-nanoflurohxylcarbonyl)] ethansulfonate (solid content: 2 mass %) | 1.0 | 1.0 | 1.0 |
| Flat metal particle dispersion B1 | 84.7 | 85.2 | 0 |
| Flat metal particle dispersion B2 | 0 | 0 | 85.7 |
| Water | 8.6 | 8.6 | 8.6 |

<Manufacturing of High Refractive Index Film>

The high refractive index films of examples and comparative examples were respectively manufactured by using the coating solution C1B, C2B, or C3B for forming a high refractive index layer manufactured by the method described above.

[Manufacturing of High Refractive Index Film According to Example C1]

The coating solution C1B for forming a high refractive index layer was spin-coated at a rotational speed of 500 rpm by using a spin coater manufactured by Mikasa Co., Ltd. on a silicon wafer having a thickness of 0.28 mm and a size of 2 inches (1 inch is 2.54 cm). Thereafter, the coating solution was heated, dried, and solidified on a hot plate at 110° C. for one minute. The above procedure was repeated 10 times to manufacture a high refractive index film according to Example C1.

Figure 16:
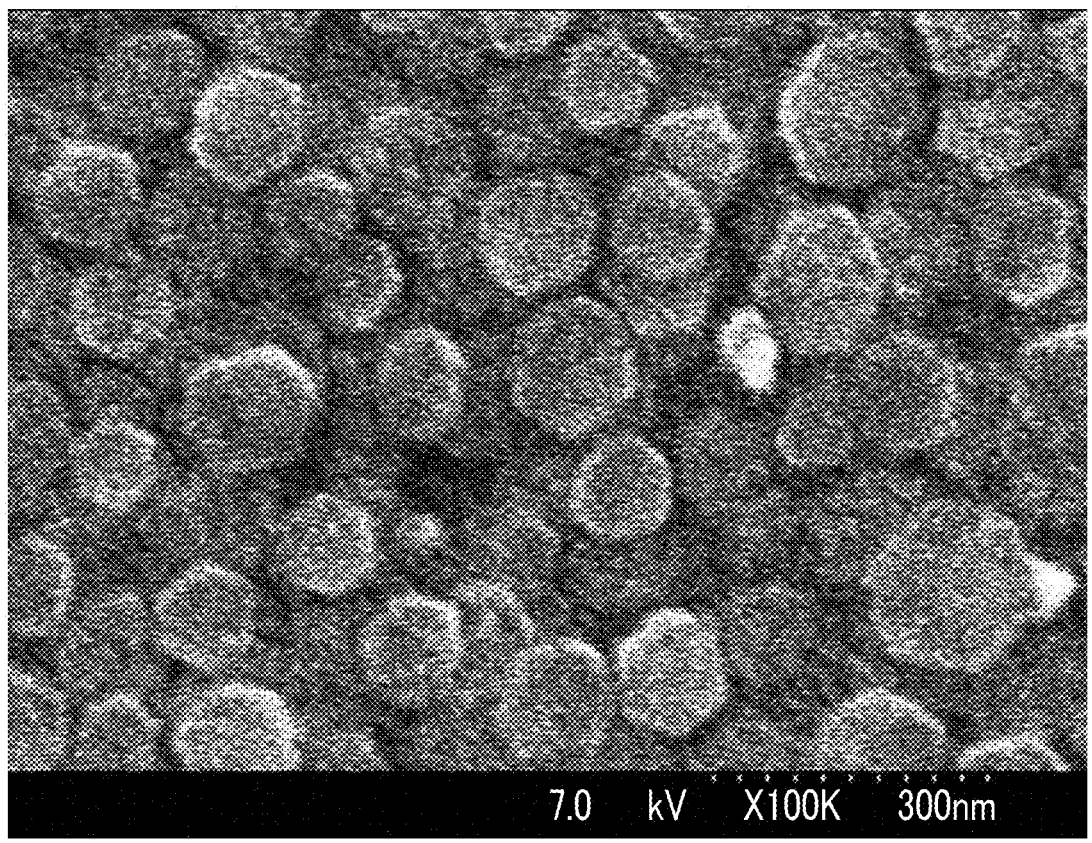
FIG. 16 is an observation image obtained by observing a high refractive index film according to Example C1 from the upper surface side (the side opposite to the base material) by using a field emission scanning electron microscope (FE-SEM).

The result of observing the high refractive index film according to Example C1 by using a SEM from an upper surface side (an opposite side to a base material) was illustrated in FIG. 16.

[Manufacturing of High Refractive Index Film According to Example C2]

A high refractive index film according to Example C2 was manufactured in the same manner as the method of manufacturing Example C1, except that the coating solution C1B for forming a high refractive index layer was changed to the coating solution C2B for forming a high refractive index layer.

[Manufacturing of High Refractive Index Film According to Example C3]

A high refractive index film according to Example C3 was manufactured in the same manner as the method of manufacturing Example C1, except that the coating solution C1B for forming a high refractive index layer was changed to the coating solution C3B for forming a high refractive index layer.

[Evaluation on Volume Fraction, Thickness, Randomness, Orientation, and Stacking Properties]

Figure 17:
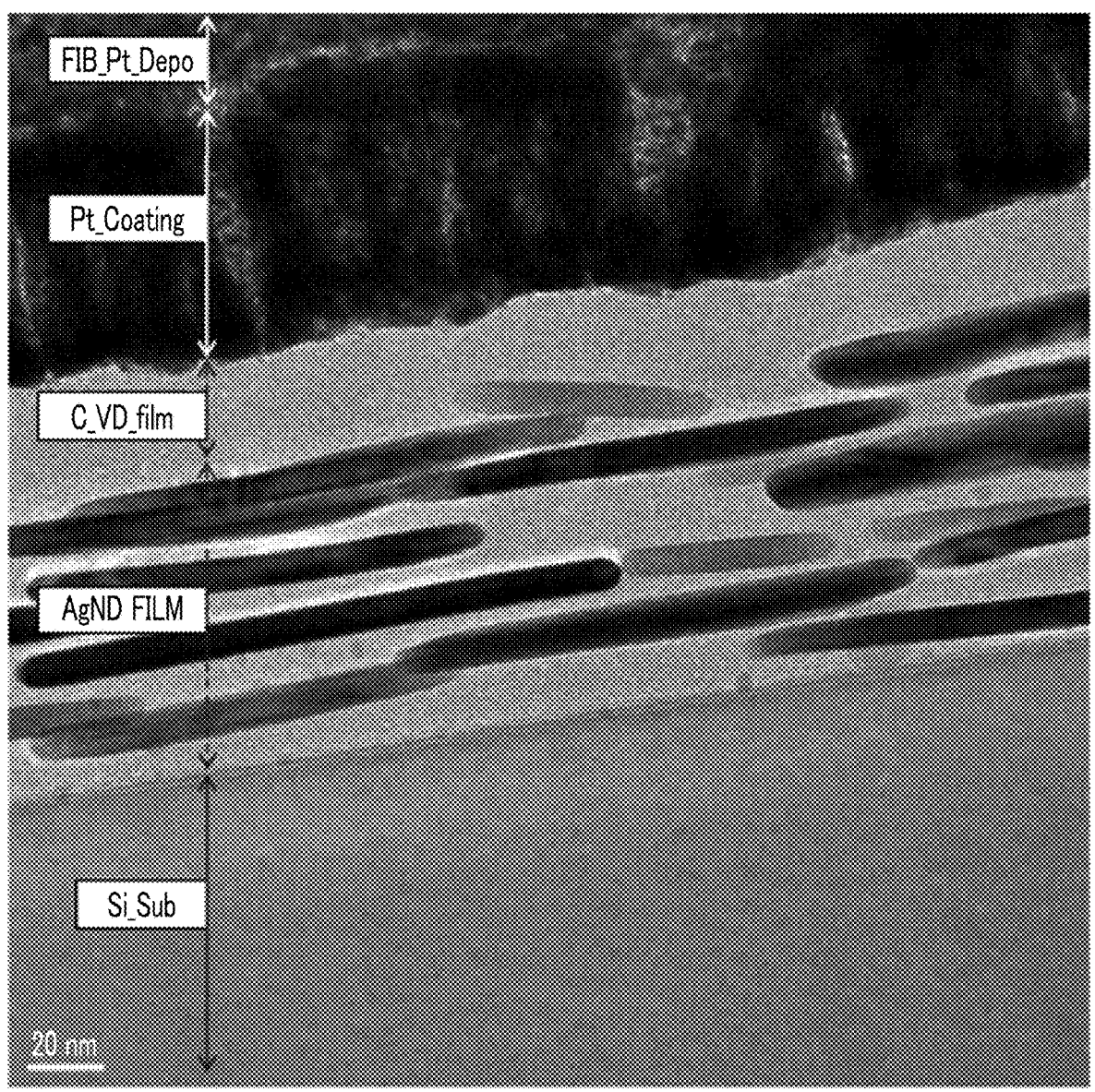
FIG. 17 is an observation image obtained by observing a cross section of the high refractive index film according to Example C1 by using a transmission electron microscope (TEM).

A cross section of the high refractive index film according to Example C1, C2, or C3 was measured by using a transmission electron microscope. For example, a cross-sectional image of Example C1 is illustrated in FIG. 17. A sample for observing a cross section was manufactured by focused ion beam (FIB) processing.

In FIG. 17, "FIB-Pt-Depo" refers to a beam assisted deposition in FIB processing, "Pt-Coating" refers to a platinum protective film formed in FIB processing, "C-VD-film" refers to a carbon film vapor deposited in FIB processing, "AgND film" refers to a high refractive index layer, and "Si-Sub" refers to a silicon wafer substrate (base material).

From the obtained cross-sectional views, evaluations were performed on a volume fraction, a thickness, randomness, plane orientation, and stacking properties, and results thereof are presented in Table 12.

In Table 12, in a case where flat metal particles were randomly arranged in the surface direction of the base material, it is described as "present" in the column of "random".

In the case where flat metal particles had a main plane that was plane-oriented in the range of 0° to 30° with respect to the surface of the base material, it is described as "present" in the column of "plane orientation".

In a case where the flat metal particles are stacked in two or more layers, it is described as "present" in the column of "Stacking".

[Evaluation of Refractive Index]

Fourier Transform Infrared Spectrophotometer (FTIR) measurement was performed on a silicon wafer having a thickness of 0.28 mm and a size of 2 inches by using FTS-7000 manufactured by Varian Medical Systems, Inc., so as to obtain the spectral reflectance and spectral transmittance of the silicon wafer at a wavelength of 2.5 µm to 25 µm. The refractive index and extinction coefficient of the silicon wafer were obtained based on the multiple reflection theory and the Fresnel interference theory, from the spectral reflectance and the spectral transmittance obtained.

FTIR measurement on Examples C1 to C3 was performed to obtain spectral transmission spectra and spectral reflection spectra of the high refractive index films according to Examples C1 to C3 at a wavelength of 2.5 µm to 25 µm.

Figure 18:
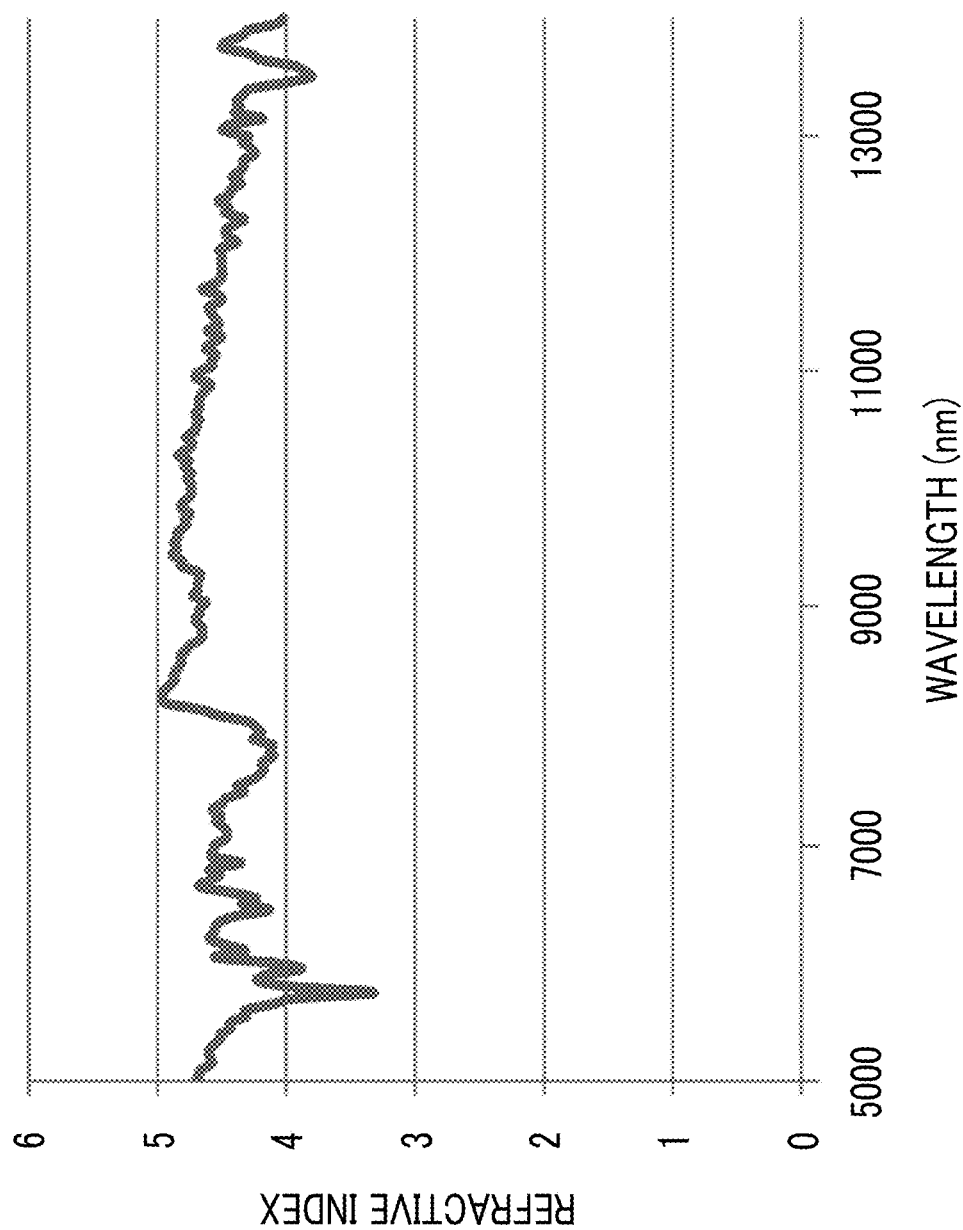
FIG. 18 is a graph presenting a refractive index spectrum in a structure of the high refractive index film according to Example C1.

The refractive indexes of the high refractive index films of Examples C1 to C3 at a wavelength of 10 µm were calculated by using the spectral reflectance and the spectral transmittance obtained, and the refractive index and extinction coefficient of the silicon wafer described above, based on the multiple reflection theory and the Fresnel interference theory. The obtained results are presented in Table 12. For example, the refractive index spectrum of the structure of the high refractive index film according to Example C1 at a wavelength of 5 µm to 15 µm is presented in FIG. 18.

TABLE 12

| | Volume fraction | Thickness | Random | Plane orientation | Stacking | Refractive index (wavelength 10 µm) |
|---|---|---|---|---|---|---|
| Example C1 | 30% | 100 nm | Present | Present | Present | 4.7 |
| Example C2 | 45% | 100 nm | Present | Present | Present | 8.0 |
| Example C3 | 30% | 100 nm | Present | Present | Present | 9.5 |

<Manufacturing of Antireflection Film>

A film was formed on a silicon wafer having a thickness of 0.28 mm and a size of 2 inches with a modified polyolefin resin aqueous dispersion (ARROWBASE SB-1200) manufactured by Unitika Ltd. by using a spin coater manufactured by Mikasa Co., Ltd. and adjusting the concentration of the aqueous dispersion and the rotation speed of the spin coater such that the film thickness was 450 nm. Thereafter, the dispersion was heated, dried, and solidified on a hot plate at 110° C. for one minute.

Subsequently, the coating solution C1B for forming a high refractive index layer was spin-coated at a rotational speed of 500 rpm by using a spin coater manufactured by Mikasa Co., Ltd. Thereafter, the solution was heated, dried, and solidified on a hot plate at 110° C. for one minute. The above procedure was repeated until the film thickness was 130 nm.

Subsequently, a film was formed with a modified polyolefin resin aqueous dispersion (ARROWBASE SB-1200)

manufactured by Unitika Ltd. by using a spin coater manufactured by Mikasa Co., Ltd. and adjusting the concentration of the aqueous dispersion and the rotation speed of the spin coater such that the film thickness was 2,200 nm. Thereafter, the dispersion was heated, dried, and solidified on a hot plate at 110° C. for one minute. An antireflection film of Example D1 was manufactured as above.

<Evaluation of Antireflection Characteristics>

FTIR measurement was performed on the antireflection film of Example D1 by using FTS-7000 manufactured by Varian Medical Systems, Inc., so as to obtain the spectral reflectances and spectral transmittances of the antireflection film of Example D1 and the silicon wafer (base material) which have a thickness of 0.28 mm at a wavelength of 2.5 µm to 25 µm. The surface reflectance of the antireflection film of Example D1 on the film surface side was derived based on the multiple reflection theory and the Fresnel interference theory used for deriving a surface reflectance, from the spectral reflectance and the spectral transmittance obtained.

Figure 19:
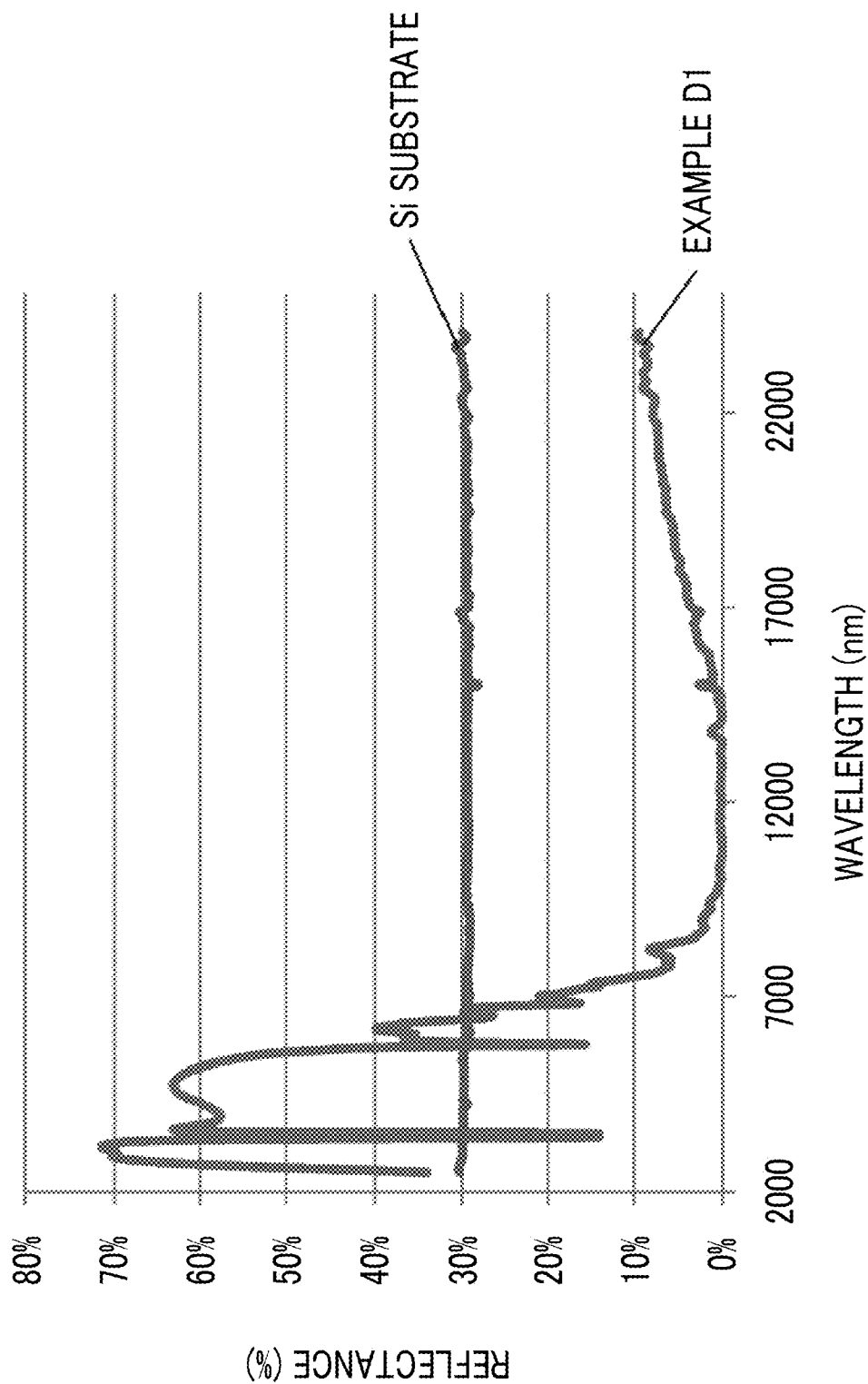
FIG. 19 is a graph presenting a reflection spectrum of an antireflection film according to Example D1.

The obtained reflection spectrum is illustrated in FIG. 19. The graph of "Si substrate" in FIG. 19 presents the reflection spectrum of a silicon wafer. In the antireflection film according to Example D1, it is understood that the antireflection effect can be obtained at least in the wavelength range of at least 6 µm to 25 µm.

As described above in the examples, according to the present disclosure, it was confirmed that it was possible to obtain a high refractive index film having a high refractive index and capable of forming a film by liquid phase film formation, and an optical interference film using the high refractive index film.

The disclosure of JP2017-063490 filed Mar. 28, 2017 is incorporated herein by reference in its entirety.

All documents, patent applications, and technical standards described in the present specification is incorporated into the present specification to the same extent in a case where each individual document, patent application, and technical standard was specifically and individually indicated to be incorporated by reference.

EXPLANATION OF REFERENCES

10: base material
12: high refractive index layer
14: low refractive index layer
20: flat metal particle
28: low refractive index layer
30: high refractive index film
f: thickness of high refractive index layer
D: particle diameter (equivalent circular diameter)
T: thickness of flat metal particle

What is claimed is:

1. A high refractive index film, comprising:
a base material; and
a high refractive index layer including a binder and flat metal particles,
wherein a value obtained by dividing an average particle diameter of the flat metal particles by an average thickness of the flat metal particles is 3 or more,
the flat metal particles have a main plane that is plane-oriented in a range of 0° to 30° with respect to a surface of the base material,
the flat metal particles have a volume fraction of 20 volume % or more in the high refractive index layer,
the flat metal particles are stacked in two or more layers, and
the high refractive index layer has a refractive index of 3 or more at a wavelength of 10 µm.

2. The high refractive index film according to claim 1, wherein the flat metal particles are randomly oriented in a surface direction of the base material.

3. The high refractive index film according to claim 1, wherein the flat metal particles at least include silver.

4. The high refractive index film according to claim 1, wherein the flat metal particles have a main plane having a hexagonal or higher polygonal shape or a circular shape.

5. The high refractive index film according to claim 1, wherein the flat metal particles exhibit localized surface plasmon resonance, and have a plasmon resonance wavelength in a wavelength range of 0.5 µm to 5 µm.

6. The high refractive index film according to claim 1, wherein the binder includes a polymer.

7. An optical interference film comprising:
the high refractive index film according to claim 1.

8. The optical interference film according to claim 7, which is an antireflection film.

9. The optical interference film according to claim 7, which is a high reflection film.

10. The optical interference film according to claim 7, which is a band pass filter or a long pass filter.

11. The high refractive index film according to claim 1, wherein the flat metal particles have an average particle diameter of 50 nm to 2,000 nm.

12. The high refractive index film according to claim 1, wherein the flat metal particles have an average thickness of 50 nm or less.

13. The high refractive index film according to claim 1, wherein the high refractive index layer has a thickness of 0.01 µm to 2 µm.

* * * * *